(12) United States Patent
Paterson et al.

(10) Patent No.: US 10,884,979 B2
(45) Date of Patent: Jan. 5, 2021

(54) AUTOMATED DOCUMENT FILING AND PROCESSING METHODS AND SYSTEMS

(71) Applicant: FutureVault Inc., Toronto (CA)

(72) Inventors: Gordon Scott Paterson, Toronto (CA); Michael Bradley, Toronto (CA); Brad Rosenberg, Toronto (CA); Ka Fu Ko, Mississauga (CA)

(73) Assignee: FutureVault Inc., Toronto (CA)

( * ) Notice: Subject to any disclaimer, the term of this patent is extended or adjusted under 35 U.S.C. 154(b) by 187 days.

(21) Appl. No.: 15/693,584

(22) Filed: Sep. 1, 2017

(65) Prior Publication Data

US 2018/0067957 A1 Mar. 8, 2018

Related U.S. Application Data

(60) Provisional application No. 62/383,284, filed on Sep. 2, 2016.

(51) Int. Cl.
| | | |
|---|---|---|
| *G06F 16/22* | (2019.01) | |
| *G06F 16/13* | (2019.01) | |
| *G06N 20/00* | (2019.01) | |
| *G06F 16/185* | (2019.01) | |
| *G06F 16/31* | (2019.01) | |
| *G06F 16/93* | (2019.01) | |
| *G06F 40/14* | (2020.01) | |
| *G06F 40/114* | (2020.01) | |
| *G06F 40/137* | (2020.01) | |
| *G06F 40/205* | (2020.01) | |

(52) U.S. Cl.
CPC ............ *G06F 16/13* (2019.01); *G06F 16/185* (2019.01); *G06F 16/313* (2019.01); *G06F 16/93* (2019.01); *G06F 40/114* (2020.01); *G06F 40/137* (2020.01); *G06F 40/14* (2020.01); *G06F 40/205* (2020.01); *G06N 20/00* (2019.01)

(58) Field of Classification Search
CPC ...... G06F 40/14; G06F 40/114; G06F 40/137; G06F 40/205; G06F 16/13; G06F 16/185; G06F 16/313; G06F 16/93; G06N 20/00
See application file for complete search history.

(56) References Cited

U.S. PATENT DOCUMENTS

| | | |
|---|---|---|
| 5,553,145 A | 9/1996 | Micali |
| 5,629,982 A | 5/1997 | Micali |

(Continued)

FOREIGN PATENT DOCUMENTS

EP 0883287 A1 9/1998

OTHER PUBLICATIONS

US 9,026,197 B2, 05/2015, Cohen et al. (withdrawn)

(Continued)

*Primary Examiner* — Tarek Chbouki
(74) *Attorney, Agent, or Firm* — Bereskin & Parr LLP/S.E.N.C.R.L., s.r.l.

(57) ABSTRACT

Systems, methods and computer program products for automatically ingesting and filing documents in a database having a plurality of file locations. An electronic file having one or more documents is received. For each document in the received file, text data is identified and used to generate a plurality of suggested file locations for the received documents. Machine learning systems may be used to enhance the accuracy of suggested file locations.

20 Claims, 9 Drawing Sheets

(56) References Cited

U.S. PATENT DOCUMENTS

| | | | |
|---|---|---|---|
| 5,689,705 A | 11/1997 | Fino et al. | |
| 5,991,769 A | 11/1999 | Fino et al. | |
| 6,137,884 A | 10/2000 | Micali | |
| 6,289,406 B1 | 9/2001 | Chambers et al. | |
| 6,289,460 B1 | 9/2001 | Hajmiragha | |
| 6,457,062 B1 | 9/2002 | Pivowar et al. | |
| 6,539,401 B1 | 3/2003 | Fino et al. | |
| 6,658,147 B2 | 12/2003 | Gorbatov et al. | |
| 6,876,766 B2 | 4/2005 | Gorbatov et al. | |
| 6,944,648 B2 | 9/2005 | Cochran et al. | |
| 6,980,332 B2 | 12/2005 | Simske | |
| 7,003,442 B1 | 2/2006 | Tsuda | |
| 7,031,526 B2 | 4/2006 | Gorbatov et al. | |
| 7,054,758 B2 | 5/2006 | Gill-Garrison et al. | |
| 7,174,043 B2 | 2/2007 | Lossev et al. | |
| 7,254,035 B2 | 8/2007 | Sasaki et al. | |
| 7,382,921 B2 | 6/2008 | Lossev et al. | |
| 7,437,003 B1 | 10/2008 | Gorbatov et al. | |
| 7,450,763 B2 | 11/2008 | Gorbatov et al. | |
| 7,685,506 B2 | 3/2010 | Fino et al. | |
| 7,783,594 B1 | 8/2010 | Pachikov | |
| 7,812,682 B2 | 10/2010 | Boroditsky et al. | |
| 8,014,630 B1 | 9/2011 | Polyakov et al. | |
| 8,051,133 B2* | 11/2011 | Schulz | H04L 51/00 |
| | | | 709/206 |
| 8,072,273 B2 | 12/2011 | Boroditsky et al. | |
| 8,239,496 B2 | 8/2012 | Peterson et al. | |
| 8,286,085 B1* | 10/2012 | Denise | G06Q 10/107 |
| | | | 715/752 |
| 8,286,199 B1 | 10/2012 | Pulaski et al. | |
| 8,290,228 B2 | 10/2012 | Cohen et al. | |
| 8,311,938 B2 | 11/2012 | Shivers et al. | |
| 8,458,194 B1* | 6/2013 | Procopio | G06F 16/35 |
| | | | 707/749 |
| 8,463,007 B2 | 6/2013 | Steinberg et al. | |
| 8,504,519 B1 | 8/2013 | Sachs et al. | |
| 8,542,900 B2 | 9/2013 | Tolkowsky et al. | |
| 8,655,961 B2 | 2/2014 | McCabe et al. | |
| 8,670,603 B2 | 3/2014 | Tolkowsky et al. | |
| 8,693,756 B2 | 4/2014 | Tolkowsky et al. | |
| 8,781,193 B2 | 7/2014 | Steinberg et al. | |
| 8,838,980 B2 | 9/2014 | Gonser et al. | |
| 8,855,744 B2 | 10/2014 | Tolkowsky et al. | |
| 8,862,575 B2 | 10/2014 | Shivers et al. | |
| 8,880,597 B1 | 11/2014 | Pachikov et al. | |
| 8,910,258 B2 | 12/2014 | Gonser et al. | |
| 8,949,706 B2 | 2/2015 | McCabe et al. | |
| 8,949,708 B2 | 2/2015 | Peterson et al. | |
| 8,953,228 B1 | 2/2015 | Mehers | |
| 8,996,457 B2 | 3/2015 | Sachs et al. | |
| 9,007,390 B2 | 4/2015 | Lang et al. | |
| 9,008,367 B2 | 4/2015 | Tolkowsky et al. | |
| 9,008,754 B2 | 4/2015 | Steinberg et al. | |
| 9,014,453 B2 | 4/2015 | Steinberg et al. | |
| 9,144,394 B2 | 5/2015 | Cohen et al. | |
| 9,053,165 B2 | 6/2015 | van Rossum | |
| 9,075,898 B1 | 7/2015 | Ayzenshtat et al. | |
| 9,101,286 B2 | 8/2015 | Tolkowsky et al. | |
| 9,129,095 B1 | 9/2015 | Lm et al. | |
| 9,147,131 B2 | 9/2015 | Libin | |
| 9,152,730 B2 | 10/2015 | Bignert et al. | |
| 9,171,132 B1 | 10/2015 | Pachikov et al. | |
| 9,171,203 B2 | 10/2015 | Chajed et al. | |
| 9,213,917 B2 | 12/2015 | Pashintsev et al. | |
| 9,216,065 B2 | 12/2015 | Cohen et al. | |
| 9,219,753 B2 | 12/2015 | Fleischman et al. | |
| 9,223,417 B1 | 12/2015 | Polyakov et al. | |
| 9,230,130 B2 | 1/2016 | Peterson et al. | |
| 9,235,768 B1 | 1/2016 | Pashintsev et al. | |
| 9,251,131 B2 | 2/2016 | McCabe et al. | |
| 9,265,458 B2 | 2/2016 | Stack | |
| 9,268,758 B2 | 2/2016 | Gonser et al. | |
| 9,285,985 B2 | 3/2016 | Lang et al. | |
| 9,292,563 B1 | 3/2016 | Engberg et al. | |
| 9,292,876 B1 | 3/2016 | Shimkus | |
| 9,305,334 B2 | 4/2016 | Barzelay et al. | |
| 9,308,052 B2 | 4/2016 | Tolkowsky | |
| 9,311,548 B2 | 4/2016 | Constantinou et al. | |
| 9,311,549 B2 | 4/2016 | Libin et al. | |
| 9,348,836 B2 | 5/2016 | Sachs et al. | |
| 9,442,627 B2 | 9/2016 | Sarnoff et al. | |
| 9,449,080 B1* | 9/2016 | Zhang | G06F 40/20 |
| 9,454,290 B1 | 9/2016 | Ma et al. | |
| 9,454,671 B2 | 9/2016 | Engberg et al. | |
| 9,460,168 B1 | 10/2016 | Sinclair | |
| 9,501,496 B2 | 11/2016 | Constantinou et al. | |
| 9,503,402 B2 | 11/2016 | Cue et al. | |
| 9,514,117 B2 | 12/2016 | Gonser | |
| 9,514,123 B2 | 12/2016 | Goel et al. | |
| 9,519,725 B2 | 12/2016 | Libin et al. | |
| 9,544,373 B2 | 1/2017 | Poletto et al. | |
| 9,558,401 B2 | 1/2017 | Chajed et al. | |
| 9,563,783 B2 | 2/2017 | Szebeni et al. | |
| 9,576,071 B2 | 2/2017 | Metreveli et al. | |
| 9,591,169 B2 | 3/2017 | Hasegawa et al. | |
| 9,594,767 B2 | 3/2017 | Victor | |
| 9,596,338 B1 | 3/2017 | Fujisaki | |
| 9,613,190 B2 | 4/2017 | Ford et al. | |
| 9,613,627 B2 | 4/2017 | Park et al. | |
| 9,619,485 B2 | 4/2017 | Yamamoto | |
| 9,633,013 B2 | 4/2017 | King et al. | |
| 9,659,013 B2 | 5/2017 | Wade et al. | |
| 9,686,304 B1 | 6/2017 | Guo et al. | |
| 9,690,986 B1 | 6/2017 | Walker et al. | |
| 9,703,758 B2 | 7/2017 | Fuse | |
| 9,729,733 B2 | 8/2017 | Kitamura | |
| 9,754,017 B2 | 9/2017 | Ebaugh et al. | |
| 9,774,372 B1 | 9/2017 | Goodwin et al. | |
| 9,798,724 B2 | 10/2017 | Tecu | |
| 9,830,433 B2 | 11/2017 | Choi et al. | |
| 9,852,122 B2 | 12/2017 | Lapshin et al. | |
| 9,852,377 B1* | 12/2017 | Kumar | G06F 16/285 |
| 9,858,513 B2 | 1/2018 | Nagata | |
| 9,881,020 B2 | 1/2018 | Ogura et al. | |
| 9,898,463 B2 | 2/2018 | Toyama | |
| 10,127,234 B1* | 11/2018 | Krishnan | G06F 16/119 |
| 2002/0038290 A1 | 3/2002 | Cochran et al. | |
| 2002/0038318 A1 | 3/2002 | Cochran et al. | |
| 2002/0082943 A1 | 6/2002 | Ibe | |
| 2002/0089825 A1 | 7/2002 | Sasaki et al. | |
| 2002/0149630 A1 | 10/2002 | Kitainik et al. | |
| 2002/0150297 A1 | 10/2002 | Gorbatov et al. | |
| 2002/0152240 A1 | 10/2002 | Kitainik et al. | |
| 2003/0023387 A1 | 1/2003 | Gill-Garrison et al. | |
| 2003/0172006 A1 | 9/2003 | Fino et al. | |
| 2004/0047506 A1 | 3/2004 | Gorbatov et al. | |
| 2004/0109607 A1 | 6/2004 | Gorbatov et al. | |
| 2004/0133560 A1 | 7/2004 | Simske | |
| 2004/0165777 A1 | 8/2004 | Lossev et al. | |
| 2004/0213455 A1 | 10/2004 | Lossev et al. | |
| 2004/0225884 A1 | 11/2004 | Lorenzini et al. | |
| 2005/0044487 A1 | 2/2005 | Bellegarda et al. | |
| 2005/0198153 A1* | 9/2005 | Keohane | G06F 3/0482 |
| | | | 709/206 |
| 2005/0244058 A1 | 11/2005 | Gorbatov et al. | |
| 2006/0080278 A1* | 4/2006 | Neiditsch | G06Q 10/107 |
| 2006/0152748 A1* | 7/2006 | McCarthy | G06F 16/355 |
| | | | 358/1.13 |
| 2006/0195461 A1* | 8/2006 | Lo | G06F 16/93 |
| 2008/0052196 A1 | 2/2008 | Fino et al. | |
| 2008/0209313 A1 | 8/2008 | Gonser | |
| 2008/0275912 A1 | 11/2008 | Roberts et al. | |
| 2009/0024912 A1 | 1/2009 | McCabe et al. | |
| 2009/0052804 A1 | 2/2009 | Lewis | |
| 2009/0292786 A1 | 11/2009 | McCabe et al. | |
| 2010/0145911 A1 | 6/2010 | Germer et al. | |
| 2010/0157041 A1 | 6/2010 | Klaiman et al. | |
| 2010/0160764 A1 | 6/2010 | Steinberg et al. | |
| 2010/0160773 A1 | 6/2010 | Cohen et al. | |
| 2010/0161022 A1 | 6/2010 | Tolkowsky | |
| 2010/0161023 A1 | 6/2010 | Cohen et al. | |
| 2010/0171819 A1 | 7/2010 | Tolkowsky et al. | |
| 2010/0191102 A1 | 7/2010 | Steinberg et al. | |
| 2010/0220917 A1 | 9/2010 | Steinberg et al. | |

(56) References Cited

U.S. PATENT DOCUMENTS

| | | |
|---|---|---|
| 2010/0222671 A1 | 9/2010 | Cohen et al. |
| 2010/0225403 A1 | 9/2010 | Boroditsky et al. |
| 2010/0228076 A1 | 9/2010 | Blank et al. |
| 2010/0250433 A1 | 9/2010 | Shivers et al. |
| 2010/0287260 A1 | 11/2010 | Peterson et al. |
| 2010/0290693 A1 | 11/2010 | Cohen et al. |
| 2011/0022536 A1 | 1/2011 | Shivers et al. |
| 2011/0047147 A1 | 2/2011 | Shivers et al. |
| 2011/0068839 A1 | 3/2011 | Boroditsky et al. |
| 2011/0196799 A1 | 8/2011 | Fino et al. |
| 2011/0218912 A1 | 9/2011 | Shivers et al. |
| 2011/0276875 A1 | 11/2011 | McCabe et al. |
| 2011/0314371 A1 | 12/2011 | Peterson et al. |
| 2012/0059811 A1 | 3/2012 | Libin et al. |
| 2012/0060098 A1 | 3/2012 | Libin et al. |
| 2012/0151380 A1* | 6/2012 | Bishop ............... G06Q 10/107 715/752 |
| 2012/0191728 A1 | 7/2012 | Libin et al. |
| 2012/0230565 A1 | 9/2012 | Steinberg et al. |
| 2012/0233044 A1 | 9/2012 | Burger et al. |
| 2012/0290926 A1* | 11/2012 | Kapadia ............... G06F 17/24 715/255 |
| 2013/0019156 A1 | 1/2013 | Gonser et al. |
| 2013/0019289 A1 | 1/2013 | Gonser et al. |
| 2013/0054595 A1 | 2/2013 | Isaev et al. |
| 2013/0054613 A1 | 2/2013 | Bishop |
| 2013/0110839 A1* | 5/2013 | Kirshenbaum ......... G06F 16/35 707/740 |
| 2013/0117089 A1 | 5/2013 | Pachikov et al. |
| 2013/0124513 A1 | 5/2013 | Bignert et al. |
| 2013/0159720 A1 | 6/2013 | Gonser et al. |
| 2013/0173727 A1 | 7/2013 | Libin et al. |
| 2013/0174031 A1 | 7/2013 | Constantinou |
| 2013/0212463 A1 | 8/2013 | Pachikov et al. |
| 2013/0226833 A1 | 8/2013 | Allison et al. |
| 2013/0234929 A1 | 9/2013 | Libin |
| 2013/0254111 A1 | 9/2013 | Gonser et al. |
| 2013/0263283 A1 | 10/2013 | Peterson et al. |
| 2013/0307829 A1 | 11/2013 | Libin |
| 2013/0307861 A1 | 11/2013 | Lang et al. |
| 2013/0318063 A1 | 11/2013 | Ayzenshtat et al. |
| 2013/0329030 A1 | 12/2013 | Tolkowsky et al. |
| 2013/0329977 A1 | 12/2013 | Tolkowsky et al. |
| 2014/0006352 A1 | 1/2014 | Sachs et al. |
| 2014/0007005 A1 | 1/2014 | Libin et al. |
| 2014/0012685 A1* | 1/2014 | Le Chevalier ......... G06Q 30/02 705/14.73 |
| 2014/0013220 A1 | 1/2014 | Ohguro |
| 2014/0029859 A1 | 1/2014 | Libin |
| 2014/0032554 A1 | 1/2014 | Constantinou et al. |
| 2014/0050396 A1 | 2/2014 | Libin et al. |
| 2014/0050398 A1 | 2/2014 | Pashintsev et al. |
| 2014/0050409 A1 | 2/2014 | Constantinou et al. |
| 2014/0094689 A1 | 4/2014 | Cohen et al. |
| 2014/0094690 A1 | 4/2014 | Tolkowsky et al. |
| 2014/0094691 A1 | 4/2014 | Steinberg et al. |
| 2014/0094692 A1 | 4/2014 | Tolkowsky et al. |
| 2014/0094693 A1 | 4/2014 | Cohen et al. |
| 2014/0100451 A1 | 4/2014 | Tolkowsky et al. |
| 2014/0107479 A1 | 4/2014 | Klaiman et al. |
| 2014/0108382 A1 | 4/2014 | Garg et al. |
| 2014/0111541 A1 | 4/2014 | Tolkowsky et al. |
| 2014/0112539 A1 | 4/2014 | Tolkowsky et al. |
| 2014/0112566 A1 | 4/2014 | Steinberg et al. |
| 2014/0114184 A1 | 4/2014 | Klaiman et al. |
| 2014/0114185 A1 | 4/2014 | Tolkowsky et al. |
| 2014/0121513 A1 | 5/2014 | Tolkowsky et al. |
| 2014/0140597 A1 | 5/2014 | Barzelay et al. |
| 2014/0154650 A1 | 6/2014 | Stack |
| 2014/0157110 A1 | 6/2014 | Abbott, Jr. et al. |
| 2014/0161331 A1 | 6/2014 | Cohen et al. |
| 2014/0164542 A1 | 6/2014 | McCabe et al. |
| 2014/0181213 A1 | 6/2014 | Hunter et al. |
| 2014/0208418 A1 | 7/2014 | Libin |
| 2014/0250491 A1 | 9/2014 | Fleischman et al. |
| 2014/0280167 A1 | 9/2014 | Ghessassi |
| 2014/0304249 A1 | 10/2014 | Ayzenshtat et al. |
| 2014/0304518 A1 | 10/2014 | Gonser et al. |
| 2014/0330900 A1 | 11/2014 | Libin et al. |
| 2014/0342327 A1 | 11/2014 | Stack |
| 2014/0358613 A1 | 12/2014 | Libin |
| 2014/0363796 A1 | 12/2014 | Stack |
| 2014/0380232 A1 | 12/2014 | Sarnoff et al. |
| 2015/0012488 A1 | 1/2015 | van Rossum |
| 2015/0012565 A1 | 1/2015 | Engberg et al. |
| 2015/0033102 A1 | 1/2015 | Losvik et al. |
| 2015/0046287 A1 | 2/2015 | Libin |
| 2015/0046367 A1 | 2/2015 | Libin et al. |
| 2015/0046370 A1 | 2/2015 | Libin et al. |
| 2015/0067464 A1 | 3/2015 | McCabe et al. |
| 2015/0067489 A1 | 3/2015 | Zotto et al. |
| 2015/0071549 A1 | 3/2015 | Chajed et al. |
| 2015/0074044 A1 | 3/2015 | Metreveli et al. |
| 2015/0074776 A1 | 3/2015 | Gonser et al. |
| 2015/0081601 A1 | 3/2015 | Ayzenshtat et al. |
| 2015/0088574 A1 | 3/2015 | Libin et al. |
| 2015/0121298 A1 | 4/2015 | Ma |
| 2015/0130703 A1 | 5/2015 | Ghajar |
| 2015/0134614 A1 | 5/2015 | Sachs et al. |
| 2015/0143218 A1 | 5/2015 | Peterson et al. |
| 2015/0143219 A1 | 5/2015 | McCabe et al. |
| 2015/0150090 A1 | 5/2015 | Carroll et al. |
| 2015/0161409 A1 | 6/2015 | Szebeni et al. |
| 2015/0169946 A1 | 6/2015 | Needleman |
| 2015/0180984 A1 | 6/2015 | Poletto et al. |
| 2015/0208975 A1 | 7/2015 | Ghajar |
| 2015/0242116 A1 | 8/2015 | Lang et al. |
| 2015/0244833 A1 | 8/2015 | Grue et al. |
| 2015/0254783 A1 | 9/2015 | Levin et al. |
| 2015/0254794 A1 | 9/2015 | Levin et al. |
| 2015/0254795 A1 | 9/2015 | Levin et al. |
| 2015/0282889 A1 | 10/2015 | Cohen et al. |
| 2015/0296012 A1 | 10/2015 | Piyush et al. |
| 2015/0302524 A1 | 10/2015 | Allison et al. |
| 2016/0012287 A1 | 1/2016 | Chajed et al. |
| 2016/0042229 A1 | 2/2016 | Liao |
| 2016/0050177 A1 | 2/2016 | Cue et al. |
| 2016/0055143 A1 | 2/2016 | Goel et al. |
| 2016/0055185 A1 | 2/2016 | Goel et al. |
| 2016/0055188 A1 | 2/2016 | Goel et al. |
| 2016/0055248 A1 | 2/2016 | Goel et al. |
| 2016/0080426 A1 | 3/2016 | Fleischman et al. |
| 2016/0085421 A1 | 3/2016 | Feeney |
| 2016/0125842 A1 | 5/2016 | Weinberg et al. |
| 2016/0127337 A1 | 5/2016 | Fleischman et al. |
| 2016/0127384 A1 | 5/2016 | VoBa |
| 2016/0140101 A1 | 5/2016 | Gosner, Jr. et al. |
| 2016/0140447 A1* | 5/2016 | Cohen .................... G06N 5/02 706/52 |
| 2016/0170950 A1 | 6/2016 | Malden |
| 2016/0171626 A1 | 6/2016 | Shimkus |
| 2016/0182465 A1 | 6/2016 | Lm et al. |
| 2016/0224517 A1 | 8/2016 | Horn et al. |
| 2016/0224523 A1 | 8/2016 | Shimkus |
| 2016/0224526 A1 | 8/2016 | Gazit et al. |
| 2016/0239471 A1 | 8/2016 | Shimkus |
| 2016/0292443 A1 | 10/2016 | von Muhlen et al. |
| 2016/0378629 A1 | 12/2016 | Gwozdz |
| 2017/0011084 A1 | 1/2017 | Goel et al. |
| 2017/0032523 A1 | 2/2017 | Klaiman et al. |
| 2017/0039180 A1 | 2/2017 | Pruitt et al. |
| 2017/0083214 A1 | 3/2017 | Furesj et al. |
| 2017/0091172 A1 | 3/2017 | Takeuchi et al. |
| 2017/0091319 A1 | 3/2017 | Legrand et al. |
| 2017/0093870 A1 | 3/2017 | Meyer |
| 2017/0123606 A1 | 5/2017 | Yamauchi |
| 2017/0123630 A1 | 5/2017 | Yamauchi |
| 2017/0124075 A1 | 5/2017 | Deng |
| 2017/0132219 A1 | 5/2017 | Deng |
| 2017/0140219 A1 | 5/2017 | King et al. |
| 2017/0142076 A1 | 5/2017 | Ford et al. |
| 2017/0206371 A1 | 7/2017 | Kim et al. |
| 2017/0228356 A1 | 8/2017 | Kee et al. |
| 2017/0235727 A1 | 8/2017 | Kee et al. |

(56) References Cited

U.S. PATENT DOCUMENTS

| | | |
|---|---|---|
| 2017/0235747 A1 | 8/2017 | Kee et al. |
| 2017/0235757 A1 | 8/2017 | Kee et al. |
| 2017/0235848 A1 | 8/2017 | Van Dusen et al. |
| 2017/0236130 A1 | 8/2017 | Kee et al. |
| 2017/0308511 A1 | 10/2017 | Beth et al. |
| 2017/0337354 A1 | 11/2017 | Drey |
| 2017/0344583 A1 | 11/2017 | Nakatsuka |
| 2017/0357711 A1 | 12/2017 | Ebaugh et al. |
| 2017/0372094 A1 | 12/2017 | Hore |
| 2018/0004713 A1 | 1/2018 | Tanaka |
| 2018/0018468 A1 | 1/2018 | Williams et al. |
| 2018/0032537 A1 | 2/2018 | Foley et al. |

OTHER PUBLICATIONS

Document relating to International Application No. PCT/CA2017/050261, dated Jun. 13, 2017 (International Search Report and Written Opinion).

Chang et al., "Using Topic Keyword Clusters for Automatic Document Clustering", IEICE Transactions on Information and Systems, Vol.E88-D, No. 8, pp. 1852-1860, Aug. 1, 2008 (Aug. 1, 2008) [retrieved on Jun. 8, 2017 (Jun. 8, 2017), Retrieved from: <https://www.mathworks.com/matlabcentral/answers/uploaded_files/20122/xx.pdf>].

"Automated Indexing of MS Office and PDF Files" and "Quickly Organize Any File on Your Computer", SimpleSoftware, online document, Nov. 8, 2015 (Nov. 8, 2015) [retrieved on Jun. 8, 2017 (Jun. 8, 2017), Retrieved from Internet Archive: <https://web.archive.org/web/20 151 108173420/http://www.simpleindex.com/Features/index_and_rename_office_documents.asp>].

Rose et al., "Content Awareness in a File System Interface: Implementing the 'Pile' Metaphor for Organizing Information", Proceedings of the 16th annual international ACM SIGIR conference on Research and development in information retrieval SIGIR '93, pp. 260-269, Jun. 27-Jul. 1, 1993 (Jun. 27, 1993) [retrieved on Jun. 8, 2017 (Jun. 8, 2017), Retrieved from: <http://d1.acm.org/citation.cfm?id=160735>].

Extended European Search Report for counterpart European Application No. 17844725.6, dated Feb. 19, 2020.

"How to distribute your 1-12 documents using keywords in ScanSnap Organizer on a PC", Apr. 30, 2014, XP055667437, Retrieved from URL:<http://scansnapcommunity.net/how-to-distribute-your-documents-using-keywords-in-scansnap-organizer-on-a-pc/> [retrieved on Feb. 11, 2020].

* cited by examiner

OCR Keywords

Filter by Level 1 Categories: none

| Level | Category Name | Keywords ( use comma (,) to separate keywords ) |
|---|---|---|
| 1 | Accounting | |
| 2 | Budgets | |
| 2 | Chartered Accountants | |
| 2 | Financial Statements | |
| 2 | General Ledger | |
| 2 | Other Accounting | |
| 2 | Personal Finance | |
| 2 | Personal Finance | |
| 1 | Banking | AMEX Bank of Canada, Bank of America, Bank of Montreal, Bank of New York Mellon, Bank of Nova Scotia, Bank |
| 2 | Bank Account | Account balance, banking statement, Branch No, cash identification, cheque total, chequing, deposit, deposit t |
| 2 | Credit Card | AMERICAN EXPRESS, available credit, cash advance, credit available, credit limit, Discover, last payment, MASTERCARD, minimum pay |
| 2 | Lines of Credit | available credit, credit available, credit limit, last payment, minimum payment, outstanding balance, overdue amount, payment due date, re |
| 2 | Loan | amount owing, interest rate, loan details, national student loan service centre, next payment, NSLSC, original repayment amount, repayme |
| 2 | Mortgages | amortization, credit protection, floating rate mortgage, interest rate fixed, IRD amount, mortgage, mortgaged, repayment charge, prepaym |
| 2 | Other Banking | |
| 2 | Safety Deposit Box | Application for Release, burial plot, descendant, estate, guardian, inventory, next of kin, strong room, vault |
| 2 | Student Loan | canada student loan, National Student Loans Service Centre, NSLSC, OSAP, student loan |
| 2 | Vehicle Financing | Auto financing, auto loan, car lease, lease busters |
| 1 | Donations | |

FIG. 7

AUTOMATED DOCUMENT FILING AND PROCESSING METHODS AND SYSTEMS

CROSS-REFERENCE TO RELATED APPLICATIONS

This application claims the benefit of U.S. Provisional Patent Application No. 62/383,284, filed Sep. 2, 2016, the entire contents of which are incorporated herein by reference.

FIELD

The described embodiments relate to electronic document management, and in particular systems, methods and computer program products for filing documents in a database.

BACKGROUND

People often use filing cabinets and file folders to store important documents. To make these filing systems useful, the folders and documents must be carefully organized and managed to make document retrieval convenient and easy. With electronic documents, databases with folder structures can be used to store documents. As with physical documents, organizing and managing the database is important in ensuring that documents are easily retrievable.

Managing electronic document databases can be a tedious and time-consuming task. Because electronic documents are easy to create and disseminate, large numbers of documents may be filed in electronic databases. The increased number of documents often results in an increased number of file folders and potential file locations, making it more difficult to identify the best filing location to store a particular document. As a result, individuals may neglect to file their documents, resulting in large numbers of unfiled documents that a user has to navigate to find a desired document.

Another difficulty when managing electronic databases is that the documents may be created with generic and/or non-descriptive names. For instance, document management systems, scanners and cameras may generate electronic documents with file names that appear random to a user or merely indicate the date on which the document was created. This makes it difficult for users to identify appropriate filing locations for these documents.

In some cases, electronic files can be generated that include a plurality of distinct documents. Because it is inconvenient to scan multiple documents separately, a series of documents may be scanned as a batch into a single electronic file. These multi-document files may have non-descriptive or generic names and may not provide any indication that multiple documents are included in the file. To properly file such documents, users may be required to review each file, identify and separate the distinct documents, create and name multiple individual documents files, and store each document to the appropriate file location. Again, this can result in a significant number of unfiled documents or a poorly organized database.

SUMMARY

In a broad aspect, there is provided a method for automatic ingestion and filing of documents in a database having a plurality of file locations. The method can include receiving an electronic file including at least one document; for each document in the at least one document: identifying text data in the document; and generating a plurality of suggested file locations for each respective document.

In some embodiments, generating the plurality of suggested file locations may comprise processing the text data at a master node to generate a plurality of suggested file locations, wherein the master node is a machine learning node common to a plurality of users; processing the text data at a client node to refine the plurality of suggested file locations for one of the plurality of users, wherein the client node is a machine learning node specific to the one of the plurality of users.

In some embodiments, the plurality of suggested file locations generated at the master node comprises first or second level file locations in a hierarchy.

In some embodiments, the plurality of suggested file locations generated at the master node comprises third or higher level file locations in a hierarchy.

In some embodiments, generating the plurality of suggested file locations comprises: comparing the one or more document keywords to a corpus of stored keywords, the corpus of stored keywords previously generated based on a plurality of documents in the database, wherein each of the stored keywords in the corpus has at least one file location association identifying a file location associated therewith; and generating a plurality of keyword scores based on the comparison of the one or more document keywords and the corpus.

In some embodiments, the method may further include identifying a plurality of pages in the file; determining a plurality of page markers for each page; determining that the at least one document in the file includes a plurality of distinct documents; and assigning each page to one of the distinct documents by grouping the plurality of pages into the distinct documents by comparing the page markers for the plurality of pages.

In some embodiments, the page markers can include image-based page markers derived from a visual appearance of the page. In some embodiments, the page markers can include text-based page markers derived from the text data in the document.

In some embodiments, the method may further include for each stored keyword in the corpus of stored keywords, determining a location-specific weighting for each file location association; and generating the plurality of suggested file locations by weighting the plurality of keyword scores using the location-specific weightings.

In some embodiments, the database can be arranged into a file directory having a plurality of folder levels with each file location in the plurality of file locations associated with a particular folder level, and the location-specific weighting for each file location association can be determined using the folder level of the file location corresponding to that file location association.

In some embodiments, the method may further include for each document in the at least one document: determining a keyword coefficient for each of the document keywords in the text data, each keyword coefficient indicating a measure of importance of the corresponding document keyword to the document; and generating the plurality of keyword scores using the keyword coefficient.

In some embodiments, the measure of importance of the corresponding document keyword to the document can be determined by: identifying keyword text attributes for the document keyword, the keyword text attributes including at least one of a text size, a text location and a text format; and determining the keyword coefficient for the document keyword in the text data based on the keyword text attributes.

In some embodiments, identifying the text data may include performing optical character recognition on the document to identify the text data.

In some embodiments, the method may further include determining a recommended file name for one of the received documents by: determining a keyword coefficient for each of the document keywords in the text data, each keyword coefficient indicating a measure of importance of the corresponding document keyword to the document; and determining the recommended file name using the keyword coefficients of the document keywords.

In another broad aspect, there is provided a computer program product for automatic ingestion and filing of documents in a database. The computer program product can include a non-transitory computer readable storage medium and computer-executable instructions stored on the computer readable storage medium. The instructions can configure a processor to: receive an electronic file including at least one document; for each document in the at least one document: identify text data in the document; and generate a plurality of suggested file locations for each respective document.

In some embodiments, generating the plurality of suggested file locations comprises: processing the text data at a master node to generate a plurality of suggested file locations, wherein the master node is a machine learning node common to a plurality of users; processing the text data at a client node to refine the plurality of suggested file locations for one of the plurality of users, wherein the client node is a machine learning node specific to the one of the plurality of users.

In some embodiments, the plurality of suggested file locations generated at the master node comprises first or second level file locations in a hierarchy.

In some embodiments, the plurality of suggested file locations generated at the master node comprises third or higher level file locations in a hierarchy.

In some embodiments, generating the plurality of suggested file locations comprises: comparing the one or more document keywords to a corpus of stored keywords, the corpus of stored keywords previously generated based on a plurality of documents in the database, wherein each of the stored keywords in the corpus has at least one file location association identifying a file location associated therewith; and generating a plurality of keyword scores based on the comparison of the one or more document keywords and the corpus.

In some embodiments, the computer program product may also include instructions for configuring the processor to: identify a plurality of pages in the file; determine a plurality of page markers for each page; determine that the at least one document in the file includes a plurality of distinct documents; and assign each page to one of the distinct documents by grouping the plurality of pages into the distinct documents by comparing the page markers for the plurality of pages.

In some embodiments, the page markers can include image-based page markers derived from a visual appearance of the page. In some embodiments the page markers can include text-based page markers derived from the text data in the document.

In some embodiments, the computer program product may also include instructions for configuring the processor to: for each stored keyword in the corpus of stored keywords, determine a location-specific weighting for each file location association; and generate the plurality of suggested file locations by weighting the plurality of keyword scores using the location-specific weightings.

In some embodiments, the database may be arranged into a file directory having a plurality of folder levels with each file location in the plurality of file locations associated with a particular folder level, and the computer program product may further include instructions for configuring the processor to determine the location-specific weighting for each file location association using the folder level of the file location corresponding to that file location association.

In some embodiments, the computer program product may also include instructions for configuring the processor to, for each document in the at least one document: determine a keyword coefficient for each of the document keywords in the text data, each keyword coefficient indicating a measure of importance of the corresponding document keyword to the document; and generate the plurality of keyword scores using the keyword coefficient.

In some embodiments, the computer program product may also include instructions for configuring the processor to determine the measure of importance of the corresponding document keyword to the document by: identifying keyword text attributes for the document keyword, the keyword text attributes including at least one of a text size, a text location and a text format; and determining the keyword coefficient for the document keyword in the text data based on the keyword text attributes.

In some embodiments, the computer program product may also include instructions for configuring the processor to identify the text data by performing optical character recognition on the document.

In some embodiments, the computer program product may also include instructions for configuring the processor to determine a recommended file name for one of the received documents by: determining a keyword coefficient for each of the document keywords in the text data, each keyword coefficient indicating a measure of importance of the corresponding document keyword to the document; and determining the recommended file name using the keyword coefficients of the document keywords.

BRIEF DESCRIPTION OF THE DRAWINGS

A preferred embodiment of the present invention will now be described in detail with reference to the drawings, in which:

FIG. 7 illustrates a screenshot of a keyword definition user interface in accordance with some embodiments=.

DESCRIPTION OF EXEMPLARY EMBODIMENTS

Figure 1A:
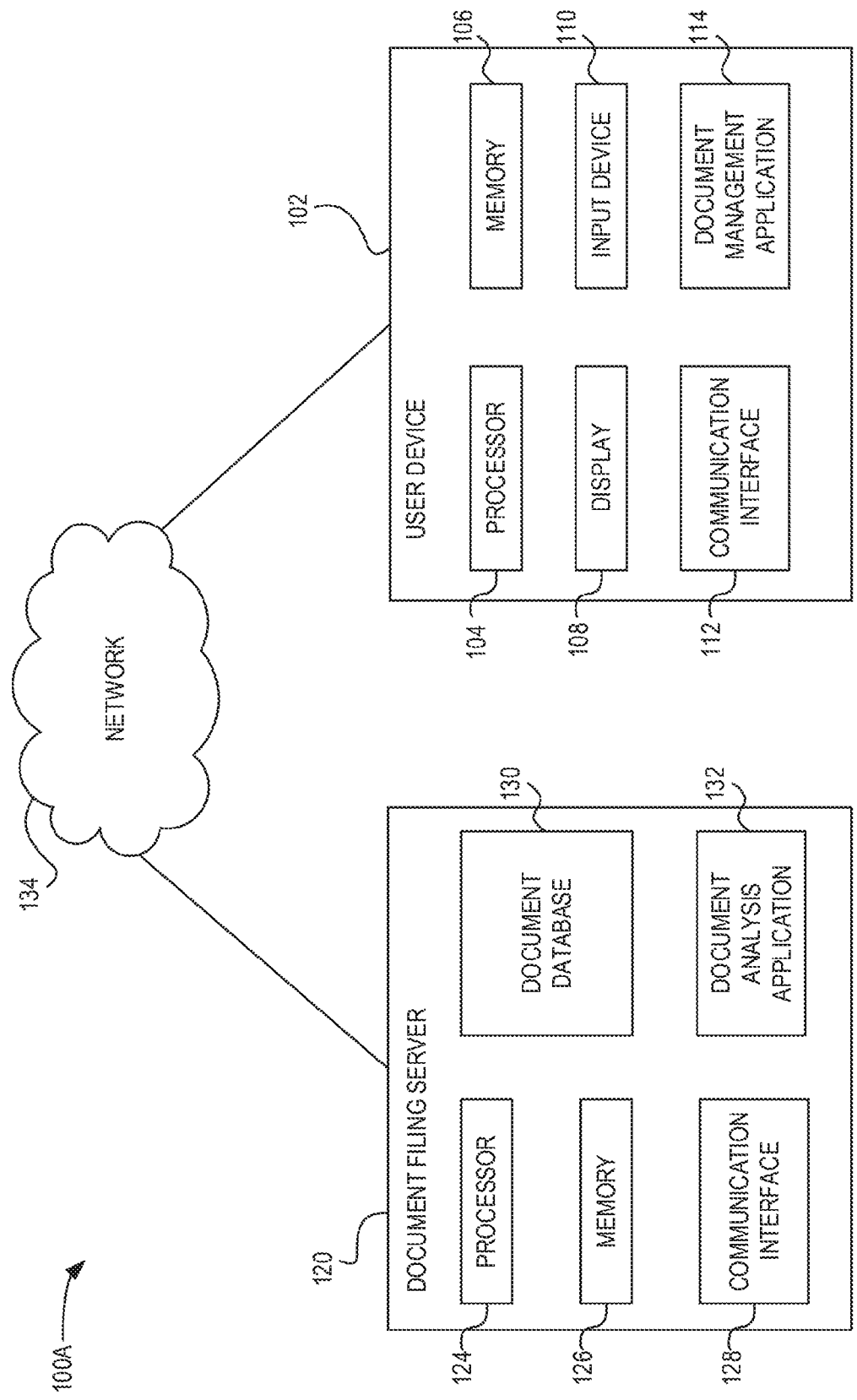
FIG. 1A illustrates a system for filing electronic documents in a database in accordance with an example embodiment.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail since these are known to those skilled in the art. Furthermore, it should be noted that this description is not intended to limit the scope of the embodiments described herein, but rather as merely describing one or more exemplary implementations.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming. Accordingly, the program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

Embodiments of the systems, methods and computer program products described herein may facilitate filing and managing electronic documents in a database. In general, the embodiments described herein may provide for automatic ingestion, management and filing of one or more documents in a database having a plurality of file locations. In some embodiments, a cloud based document management or bookkeeping system is provided.

The embodiments described herein may involve receiving one or more documents. The documents may be received in various formats, such as email attachments, documents uploaded and/or moved between computing devices or between applications on a computing device, and/or documents generated using scanners or digital cameras for example.

Manual approaches to document filing can be time consuming and may result in documents being filed to sub-optimal file locations (e.g. the first somewhat relevant folder a user sees). The embodiments described herein may provide a structured bookkeeping filing system that automates digital document storage to allow users to quickly and accurately store and organize their important documents digitally.

The embodiments described herein may provide improved techniques for organizing and storing such received documents by determining potential filing locations. The potential filing locations may be sorted or ranked and used to generate suggested filing locations. The suggested filing locations may be displayed to a user to allow the user to file a document. The suggested filing locations may also be used to automatically file a document.

Text data from received documents can be compared with stored keywords. Each stored keyword is associated with one or more filing locations. The stored keywords may include the folder names in a fixed directory structure, keywords assigned to the folders within the directory structure, and text data of previously saved documents. The comparison can be used to generate keyword scores indicating the relevance of the stored keywords to the text data in a document. The keyword scores for the stored keywords, and their associations with particular filing locations, can be used to determine the suggested filing locations.

Embodiments described herein may also generate recommended file names and file locations for the electronic documents. In some cases, the recommended file names may be initial file names for newly created documents, or recommended modifications to existing file names (e.g. where generic or non-descriptive file names are used).

In some cases, files may be received that include multiple documents within a single file. These multi-document files may be separated into separate files for each document by grouping the pages in the file into distinct documents. The grouping can be done based on page markers derived from the pages in the document. The page markers may include image-based page markers derived from the visual appearance of the page. The page markers may also include text-based page markers determined from the text data in the file. A distinct file name may be generated for each of the separate files. File locations may also be determined and suggested for each file.

To identify suggested filing locations and/or recommended file names text data can be identified in a received document. For instance, if the document is an electronically created document then the text data may be automatically identified because it is already in a format recognizable to the computing system. In other cases, e.g. where documents are scanned or generated by a digital camera, techniques such as optical character recognition may be used to identify the text data.

In some embodiments, once text data has been identified in a document, the text data can be indexed to identify one or more document keywords. Indexing the text data may include identifying a plurality of document keywords in the document text. The document keywords may be identified while excluding various commonly used words. For instance, articles may be excluded from being considered document keywords. The indexing may also include determining a word occurrence level. The word occurrence level may be an absolute number of times the word is present in the document. Alternatively, the word occurrence level may be a relative measure of how often the word is present in the document.

In some cases, words that are present in the document more than a keyword threshold number of times may be identified as document keywords. That is, the word occurrence level may need to meet the keyword threshold in order to be considered a document keyword. The keyword threshold may be determined based on the length of the document or other potential keywords in a document. In some cases, the keyword threshold may be an absolute keyword threshold, e.g., 5 or 10 times per page. In other cases, the keyword threshold may be a relative keyword threshold, e.g., the 5 or 10 most prevalent potential keywords.

The document keywords can be compared to a corpus of stored keywords. The corpus of stored keywords can be generated using documents previously stored in the database. For example, the corpus of stored keywords may include keywords determined from the file name of previously stored documents and/or document keywords identified in previously stored documents. The corpus of stored keywords may also be determined from attributes of the database directory.

For example, the corpus of stored keywords may include keywords determined from folder names and/or file location names. In some cases, the corpus of stored keywords may include user-defined keywords. A user may enter keywords to be associated with specific files or folders. In some cases, keywords may be automatically pre-populated into the corpus of keywords and associated with file locations/folders (e.g., the keyword "IRS" may be associated with a folder for tax documents).

Each of the stored keywords in the corpus has at least one file location association that identifies a file location associated with that stored keyword. In some cases, a stored keyword may have two or more file location associations identifying different file locations. The file location associations may be generated automatically, e.g. based on the document keywords, or document file name of documents previously filed to a particular file location. In some cases, file location associations may also be generated manually when user-defined keywords are entered by users to be associated with particular file locations.

Based on the comparison of the one or more document keywords and the corpus, a plurality of keyword scores may be generated. The plurality of keyword scores may indicate relevance or a match between the document keywords in a particular document and one or more stored keywords in the corpus. The plurality of keyword scores may then be used to generate a plurality of suggested file locations using the file location associations of the corresponding keywords.

In some embodiments, documents and/or their text data may be input to an artificial intelligence (AI) or machine learning system, which can be trained to identify associations between portions of the text data and file names or file locations, and to output suggested file names or file locations following analysis of each document.

The machine learning system can be pre-trained using preset file naming conventions and example folder hierarchies. Such preset file naming conventions may in some cases consider multiple naming conventions, to account for differences in how some users will choose to name their files.

When outputting predictions for file names and locations, it may be difficult to account for the preferences of a wide number of users. Attempting to do so may lead to large storage requirements, slower processing times, and reduced accuracy. For example, one user may prefer to have file names that include spaces, whereas another user may prefer to replace spaces in a file name with underscore characters. One user may prefer to store dates in a file name using the ISO 8601 format (e.g., yyyy-mm-dd), while another user may prefer dates to be formatted using a local convention, such as the month-day-year convention that is prevalent in the United States. Still other users may prefer to include certain keywords in a file name (e.g., institution name, account number, etc.).

The wide variety of user preferences may make it difficult for a single machine learning node to accurately predict file names and file locations for a wide variety of users. Accordingly, in some embodiments, multiple connected machine learning nodes may be used to make predictions. In particular, there may be a master node that is common to a plurality of users, and there may be a client node that is common to a single user (or a subset of the plurality of users).

The master node may be trained using a generic data set, and may be used to output predictions of only high-level file locations and file names. For example, the master node may predict file locations at a first level and a second level (e.g., "/Banking/Bank Accounts"), and may predict certain elements that may be used in a file name. The client node may then predict the third and subsequent levels of the file locations, along with the predicted file name, which will be based on the client node's learned associations.

The system may thus be considered a multi-node machine learning system, in which learning and processing is distributed across multiple nodes. In addition, learned knowledge may be pushed back from client nodes to the master node in a feedback process, to assist the master node in improving its first and second level predictions. This frees the client nodes to adapt and specialize their predictions to a user's particular tastes.

The machine learning system may be a supervised AI or an unsupervised AI.

In some cases, documents may be automatically filed to the suggested file locations, at least temporarily. In other cases, a user may be prompted to approve the suggested file location or identify another file location before the document is stored to a file location. If a user chooses to defer selecting a file location, the document may be temporarily filed to the suggested filing location, or alternatively the document may be stored in an unfiled document folder. A user may be periodically prompted to select or approve the file location for documents for which filing was deferred. In embodiments that use machine learning, user selections may be fed back to the local and master nodes to improve future prediction performance.

In embodiments that use a keyword corpus, the stored keywords in the corpus may have location-specific weightings for each of their corresponding file associations. The location-specific weightings may be used to generate the suggested file locations by weighting the keyword scores for particular file locations.

The location-specific weightings may indicate the relevance of the stored keyword to a specific location. That is, a file association may be given a higher location-specific weighting when the stored keyword is more relevant to the particular file location. For example, where multiple stored keywords are associated with a particular file location, the keywords may be scored and/or ranked to indicate the relevance of that keyword to the particular file location.

In other cases, the location-specific weighting may be determined based on the particular file location. For example, the database may include a number of folder levels (e.g. categories and sub-categories) with sub-folders nested within higher level folders. A location-specific weighting may be greater for file locations corresponding to sub-folders (i.e. sub-categories or more specific file locations) than file locations corresponding to the above folders. In some cases, a user may manually adjust the location-specific weighting for a stored keyword associated with a particular file location.

In some embodiments, a keyword coefficient may be determined for the document keywords identified in the text data. A keyword coefficient may indicate a measure of importance of the document keyword to the document. For example, the keyword coefficient may be determined using the word occurrence level of a keyword in the document. The plurality of keyword scores for a particular document may then be generated using the keyword coefficient. The keyword coefficient can also be used to identify important keywords indicative of a recommended file name.

In some embodiments, the importance of a document keyword within a document may be determined based on keyword text attributes of the document keyword. Keyword text attributes may include text location, text size, and text formatting for example. For example, the keyword text location may be determined based on the location or location(s) of the document keyword within the document. For example, text located near the beginning or top of a page may be identified as of greater importance than text further below in the page. Similarly, text size may be used to determine the importance of a document keyword within a document. Larger text may indicate keywords that are more important to the document. Text formatting, such as bolding or underlining may also indicate keywords that may be more important to a document.

In some cases, the document may be identified as a particular document type from a plurality of document types. The plurality of document types may be pre-populated in the system as template document types (e.g. common business forms, papers etc.). The plurality of document types can also be updated continuously as new documents and new document templates are stored in the system.

A plurality of document regions may be identified for a document type. For example, document regions may include title regions, header regions, footer regions, body regions, or other regions specific to document types. The document regions within the document may then be associated with a regional importance measure for the document type. For example, the title region of a document may be identified as a highly important region in various document types.

In other cases, other regions within the document may also be identified as being important. For example, a document type such as an income tax document may always have the same title but another region, such as a header region, may include text data that is more descriptive of the specific document. Accordingly, in such embodiments the header region may be identified as a highly important region in that document type.

The keyword coefficients for each of the document keywords in the text data can be determined based on the document region for that document keyword within the document. Document keywords present in one or more highly relevant regions of the document may have a greater keyword coefficient than other potential keywords that occur often, but in less important regions of the document.

In some cases, documents may be received as separate electronic files. In other cases, multiple documents may be received as a single file. In such cases, some embodiments described herein may automatically identify distinct documents in the file and separate the pages into those documents. For instance, when multiple documents are scanned as a batch into a single electronic file, it may be cumbersome for an individual to manually separate the file into the distinct documents. Accordingly, the embodiments described herein may analyze such a scanned file to identify the presence of multiple distinct documents and assign the pages to the corresponding documents.

A plurality of pages may be identified in the received file. Page markers may then be determined for each page. The page markers may include image-based page markers derived from the visual appearance of the page. For example, image-based page markers may include staple position, angle of text, layout of text, size of text, page number position, scan marks, scan lines, page outlines, and others. The image-based page markers may also include other image characteristics such as the average density or grey scales of the document.

The page markers may also include text-based page markers derived from the text data in the document. For example, the text-based page markers may identify corresponding header/footer data, page numbering, and grammar indicators (e.g. no punctuation in the text data at the end of a page, no capital letter in the text data at the beginning of a page). The page markers may also include metadata page markers determined from metadata extracted from the received file.

The embodiments described herein may determine that the file includes a plurality of distinct documents. For example, the plurality of distinct documents may be identified based on the page markers identified in the plurality of pages. Each of the pages in the plurality of pages may be assigned to one of the distinct documents by grouping the plurality of pages using the page markers. In some cases, the grouping of pages and identification of a plurality of distinct documents may occur substantially simultaneously, e.g. using clustering or classification techniques such as Bayesian classifiers. The embodiments described herein may then identify suggested file locations for each of the distinct documents identified.

In some cases, the embodiments described herein may also generate file names for the electronic documents. For example, when multiple distinct documents are received in a single file, new file names may be required for each distinct file. Rather than requiring a user to manually input a file name, or generating a non-descriptive file name, the embodiments herein may generate file names for the received documents based on the text data in the documents. For example, the recommended file name may be determined based on keyword text attributes, such as the text size/location/formatting discussed above. Similarly, document regions of may also be used to identify keywords that may be relevant to the document file name. Keyword coefficients can also be used to identify words that may be relevant to the document file name.

In some cases, the document keywords in a document may be compared to stored file names associated with the plurality of suggested file locations determined for that document. A recommended file name for a document may be determined based on the comparison.

The recommended file name may also be determined taking into account the relationship between previously stored file names and the text data within the corresponding documents. That is, a file naming convention may be determined based on text data from previously stored documents. For instance, if a previously stored document has a title document region and a date document region, and text data from those regions appears in the file name, a similar naming convention may be used to automatically generate the recommended file name.

In some cases, the file will automatically be given the recommended file name, at least temporarily. A user may be prompted to approve the suggested file name, or to generate an alternative filename.

In the embodiments described herein, determining suggested file locations may simplify the task of filing a large number of electronic documents in a digital database or digital filing cabinet. The embodiments described herein may enable a user to more easily and rapidly identify one or more file locations for saving their business or personal documents that may facilitate later retrieval. Generating recommended file names may further facilitate the management of files, by providing a user with a one-click option for creating or modifying a file name.

Embodiments where multi-document files can be automatically separated with the pages grouped into distinct document files may significantly reduce the time required for users to upload, name and file large numbers of documents. Rather than scanning many documents separately, multiple documents uploaded in a single scan can be automatically split and stored as separate documents.

Referring now to FIG. 1A, shown therein is an example embodiment of a system 100 that may be used for automatic filing of documents. System 100 generally comprises a plurality of computers connected via data communication network 134, which itself may be connected to the Internet.

As shown in FIG. 1A, system 100 includes at least one user device 102 that is coupled to a document filing server 120 over network 134.

Typically, the connection between network 134 and the Internet may be made via a firewall server (not shown). In some cases, there may be multiple links or firewalls, or both, between network 134 and the Internet. Some organizations may operate multiple networks 134 or virtual networks 134, which can be internetworked or isolated. These have been omitted for ease of illustration, however it will be understood that the teachings herein can be applied to such systems. Network 134 may be constructed from one or more computer network technologies, such as IEEE 802.3 (Ethernet), IEEE 802.11 and similar technologies.

Computers and computing devices such as user device 102 and server 120 may be connected to network 134 or a portion thereof via suitable network interfaces. In some cases, the user device 102 may connect to server 120 using network 134 via the Internet. In other cases, the user device 102 may be directly linked to server 120, for example, via a Universal Serial Bus, Bluetooth™ or Ethernet connection.

Figure 1B:
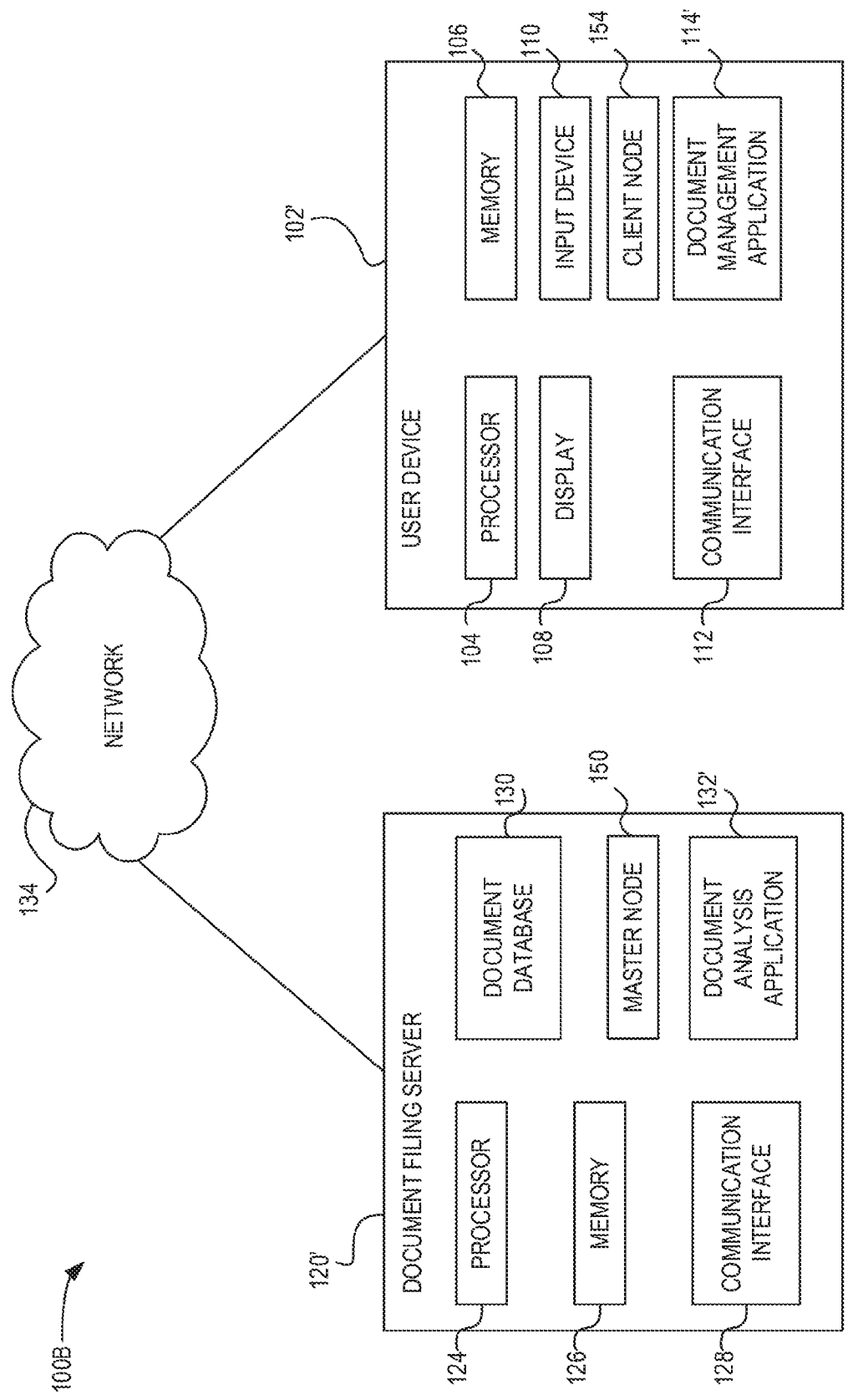
FIG. 1B illustrates a system for filing electronic documents in a database in accordance with another example embodiment.

The user device 102 may be a computer such as a smart phone, desktop or laptop computer, which can connect to network 134 via a wired Ethernet connection or a wireless connection. The user device 102 has a processor 104, a memory 106 that may include volatile memory and non-volatile storage, at least one communication interface 112, input devices 110 such as a keyboard and trackpad, output devices such as a display 108 and speakers, and various other input/output devices as will be appreciated. The user device 102 may also include computing devices such as a smartphone or tablet computer. Only one user device 102' is shown in FIG. 1B for ease of illustration, however there may be a plurality of user devices 102' in system 100'.

Processor 104 is a computer processor, such as a general purpose microprocessor. In some other cases, processor 104 may be a field programmable gate array, application specific integrated circuit, microcontroller, or other suitable computer processor.

Processor 104 is coupled to display 108, which is a suitable display for outputting information and data as needed by various computer programs. In particular, display 108 may display graphical user interfaces (GUI), such as the example user interfaces shown in FIGS. 5-7 discussed below. The user device 102 may execute an operating system, such as Apple iOS™, Microsoft Windows™, GNU/Linux, or other suitable operating system.

Communication interface 112 is one or more data network interface, such as an IEEE 802.3 or IEEE 802.11 interface, for communication over a network.

Processor 104 is coupled, via a computer data bus, to memory 106. Memory 106 may include both volatile and non-volatile memory. Non-volatile memory stores computer programs consisting of computer-executable instructions, which may be loaded into volatile memory for execution by processor 104 as needed. It will be understood by those of skill in the art that references herein to user device 102 as carrying out a function or acting in a particular way imply that processor 104 is executing instructions (e.g., a software program/application) stored in memory 106 and possibly transmitting or receiving inputs and outputs via one or more interface. Memory 106 may also store data input to, or output from, processor 104 in the course of executing the computer-executable instructions.

As used herein, the term "software application" or "application" refers to computer-executable instructions, particularly computer-executable instructions stored in a non-transitory medium, such as a non-volatile memory, and executed by a computer processor. The computer processor, when executing the instructions, may receive inputs and transmit outputs to any of a variety of input or output devices to which it is coupled.

For instance, a document management application 114 may be stored on the user device 102. Although shown separately from memory 106, it will be understood that document management application 114 may be stored in memory 106. In general, the document management application 114 may provide a user of the user device 102 with user interfaces for interacting with and managing storage of documents in document database 130. While document management application 114 is shown as being provided on the user device 102, the document management application 114 may be provided as a cloud application accessible to the user device 102 over the Internet using network 134. The document management application 114 may communicate with a document analysis application 132 of server 120 to assist the server 120 in organizing and managing documents in the document database 130.

The server 120 may be a computer such as a desktop or server computer, which can connect to network 134 via a wired Ethernet connection or a wireless connection. The server 120 has a processor 124, a memory 126 that may include volatile memory and non-volatile storage, at least one communication interface 128, and a document database 130. The processor 124, memory 126, and communication interface 128 may be implemented in generally the same manner as with processor 104, memory 106, and communication interface 112 respectively.

Although shown as separate elements, it will be understood that database 130 may be stored in memory 126. Optionally, server 120 may include additional input or output devices, although this is not required. As with all devices shown in system 100, there may be multiple servers 120, although not all are shown. In some cases, server 120 may be distributed over a plurality of computing devices, for instance operating as a cloud server. As with user device 102, references to acts or functions by server 120 imply that processor 124 is executing computer-executable instructions (e.g., a software program) stored in memory 126.

As noted above, memory 126 may also store database 130. In some example embodiments, database 130 is a relational database. In other embodiments, database 130 may be a non-relational database, such as a key-value database, NoSQL database, a graph database, or the like. In some cases, database 130 may be formed from a mixture of relational and non-relational databases.

The user device 102 and document filing server 120 may have various additional components not shown in FIG. 1A. For example, additional input or output devices (e.g., keyboard, pointing device, etc.) may be included beyond those shown in FIG. 1A.

Data stored in the database 130 can be arranged into a file directory system with a plurality of file locations. The file directory system may include a plurality of folder levels, with high-level folders having one or more sub-folders that provide for more granular organization of files. Each file location in the plurality of file locations can be associated with a particular folder (and thus a particular folder level), and may also have secondary associations with each of the folders above that folder in a hierarchy. The folders and sub-folders may reflect categories and sub-categories used to organize documents. Although described as folder levels within a hierarchy, the files need not be stored in a hierarchical manner, and may instead merely have data attributes that may be indicative of a relative position in a logical hierarchy.

The server 120 may store a software application referred to herein as a document analysis application 132. Although shown separately from memory 126, it will be understood that document analysis application 132 may be stored in memory 116. The document analysis application 132 may be configured to analyze documents received by document filing server 120 to determine suggested file locations in database 130. The document analysis application 132 may also be configured to identify and separate distinct documents within received files. The document analysis application 132 may also generate recommended file names for the document files.

While document analysis application 132 and document management application 114 are shown as separate applications, it will be understood that operations described as being performed by these applications may be performed by a single application operating on either the server 120 or user device 102, or such operations may be distributed between the user device 102 and server 120.

The document analysis application 132 may identify text data within received documents, for example using optical character recognition. The text data may be indexed and analyzed to identify document keywords. The document keywords can be compared against stored keywords such as folder names within the file directory structure, keywords associated with file locations and document keywords from text data of other previously saved documents to generate keyword scores. The keyword scores can be used to sort potential filing locations based on relevance rankings or best match, and then one or more of the potential file locations can be displayed to the user as suggested file locations for storing a document.

Computer vision and machine learning analysis can be applied to the text data to determine document keywords and recommended file names for the documents received by the system. Page markers, including image characteristics and text data markers, may be used to identify one or more distinct documents in a received file and to split the pages in the received file into the distinct documents.

Referring now to FIG. 1B, shown therein is an example embodiment of a system 100' that may be used for automatic filing of documents. System 100' generally comprises a plurality of computers connected via data communication network 134, which itself may be connected to the Internet. As shown in FIG. 1B system 100' includes at least one user device 102' that is coupled to a document filing server 120' over network 134.

Typically, the connection between network 134 and the Internet may be made via a firewall server (not shown). In some cases, there may be multiple links or firewalls, or both, between network 134 and the Internet. Some organizations may operate multiple networks 134 or virtual networks 134, which can be internetworked or isolated. These have been omitted for ease of illustration, however it will be understood that the teachings herein can be applied to such systems. Network 134 may be constructed from one or more computer network technologies, such as IEEE 802.3 (Ethernet), IEEE 802.11 and similar technologies.

Computers and computing devices such as user device 102' and server 120' may be connected to network 134 or a portion thereof via suitable network interfaces. In some cases, the user device 102' may connect to server 120' using network 134 via the Internet. In other cases, the user device 102 may be directly linked to server 120', for example, via a Universal Serial Bus, Bluetooth™ or Ethernet connection.

The user device 102' may be a computer such as a smart phone, desktop or laptop computer, which can connect to network 134 via a wired Ethernet connection or a wireless connection. The user device 102' has a processor 104, a memory 106 that may include volatile memory and non-volatile storage, at least one communication interface 112, input devices 110 such as a keyboard and trackpad, output devices such as a display 108 and speakers, and various other input/output devices as will be appreciated. The user device 102' may also include computing devices such as a smartphone or tablet computer. Only one user device 102' is shown in FIG. 1B for ease of illustration, however there may be a plurality of user devices 102' in system 100'.

Processor 104 is a computer processor, such as a general purpose microprocessor. In some other cases, processor 104 may be a field programmable gate array, application specific integrated circuit, microcontroller, or other suitable computer processor.

Processor 104 is coupled to display 108, which is a suitable display for outputting information and data as needed by various computer programs. In particular, display 108 may display graphical user interfaces (GUI), such as the example user interfaces shown in FIGS. 5-7 discussed below. The user device 102' may execute an operating system, such as Apple iOS™, Microsoft Windows™, GNU/Linux, or other suitable operating system.

Communication interface 112 is one or more data network interface, such as an IEEE 802.3 or IEEE 802.11 interface, for communication over a network.

Processor 104 is coupled, via a computer data bus, to memory 106. Memory 106 may include both volatile and non-volatile memory. Non-volatile memory stores computer programs consisting of computer-executable instructions, which may be loaded into volatile memory for execution by processor 104 as needed. It will be understood by those of skill in the art that references herein to user device 102' as carrying out a function or acting in a particular way imply that processor 104 is executing instructions (e.g., a software program/application) stored in memory 106 and possibly transmitting or receiving inputs and outputs via one or more interface. Memory 106 may also store data input to, or output from, processor 104 in the course of executing the computer-executable instructions.

The computer processor, when executing the instructions, may receive inputs and transmit outputs to any of a variety of input or output devices to which it is coupled.

For instance, a document management application 114' may be stored on the user device 102'. Although shown separately from memory 106, it will be understood that document management application 114' may be stored in memory 106. In general, the document management application 114' may provide a user of the user device 102' with user interfaces for interacting with and managing storage of documents in document database 130. While document management application 114' is shown as being provided on the user device 102', the document management application 114' may be provided as a cloud application (e.g., executed by processor 124 of server 120') accessible to the user device 102' over the Internet using network 134. The document management application 114' may communicate with a document analysis application 132' of server 120', and with a master node 150 and client node 154, as described herein to organize and manage documents in the document database 130. In some embodiments, the document management application 114' may perform the functions of client node 154, while in other embodiments there may be distinct processes for each.

The server 120' may be a computer such as a desktop or server computer, which can connect to network 134 via a wired Ethernet connection or a wireless connection. The server 120' has a processor 124, a memory 126 that may include volatile memory and non-volatile storage, at least one communication interface 128, and a document database 130. The processor 124, memory 126, and communication interface 128 may be implemented in generally the same manner as with processor 104, memory 106, and communication interface 112 respectively.

Although shown as separate elements, it will be understood that database 130 may be stored in memory 126. Optionally, server 120 may include additional input or output devices, although this is not required. As with all devices shown in system 100, there may be multiple servers 120', although not all are shown. In some cases, server 120' may be distributed over a plurality of computing devices, for instance operating as a cloud server. As with user device 102', references to acts or functions by server 120' imply that processor 124 is executing computer-executable instructions (e.g., a software program) stored in memory 126.

As noted above, memory 126 may also store database 130. In some example embodiments, database 130 is a relational database. In other embodiments, database 130 may be a non-relational database, such as a key-value database, NoSQL database, a graph database, or the like. In some cases, database 130 may be formed from a mixture of relational and non-relational databases.

The user device 102' and document filing server 120' may have various additional components not shown in FIG. 1B. For example, additional input or output devices (e.g., keyboard, pointing device, etc.) may be included beyond those shown in FIG. 1B.

Data stored in the database 130 can be arranged into a file directory system with a plurality of file locations. The file directory system may include a plurality of folder levels, with high-level folders having one or more sub-folders that provide for more granular organization of files. Each file location in the plurality of file locations can be associated with a particular folder (and thus a particular folder level), and may also have secondary associations with each of the folders above that folder in a hierarchy. The folders and sub-folders may reflect categories and sub-categories used to organize documents. Although described as folder levels within a hierarchy, the files need not be stored in a hierarchical manner, and may instead merely have data attributes that may be indicative of a relative position in a logical hierarchy.

The server 120' may store a software application referred to herein as a document analysis application 132'. Although shown separately from memory 126, it will be understood that document analysis application 132' may be stored in memory 116. The document analysis application 132' may be configured to analyze documents received by document filing server 120' to determine suggested file locations in database 130. The document analysis application 132' may also be configured to identify and separate distinct documents within received files. The document analysis application 132' may also generate recommended file names for the document files. The document analysis application 132' may communicate with a document management application 114' of device 102', and with a master node 150 and client node 154, as described herein to organize and manage documents in the document database 130. In some embodiments, the document management application 132' may perform the functions of master node 154, while in other embodiments there may be distinct processes for each.

While document analysis application 132' and document management application 114' are shown as separate applications, it will be understood that operations described as being performed by these applications may be performed by a single application operating on either the server 120' or user device 102', or such operations may be distributed between the user device 102' and server 120'.

Similarly, while the master node 150 and client node 154 are shown as being provided by server 120' and user device 102' respectively, in some embodiments, this functionality may be further combined or subdivided among different devices. For example, in some embodiments, server 120' may provide both master node 150 and client node 154.

The document analysis application 132' may identify text data within received documents, for example using optical character recognition. Working with master node 150 and client node 154 as described herein, the text data may be processed to determine suggested or predicted file names, file locations, or both.

Computer vision and machine learning analysis can be applied to the text data prior to processing by master node 150 and client node 154. Page markers, including image characteristics and text data markers, may be used to identify one or more distinct documents in a received file and to split the pages in the received file into the distinct documents.

Figure 2A:
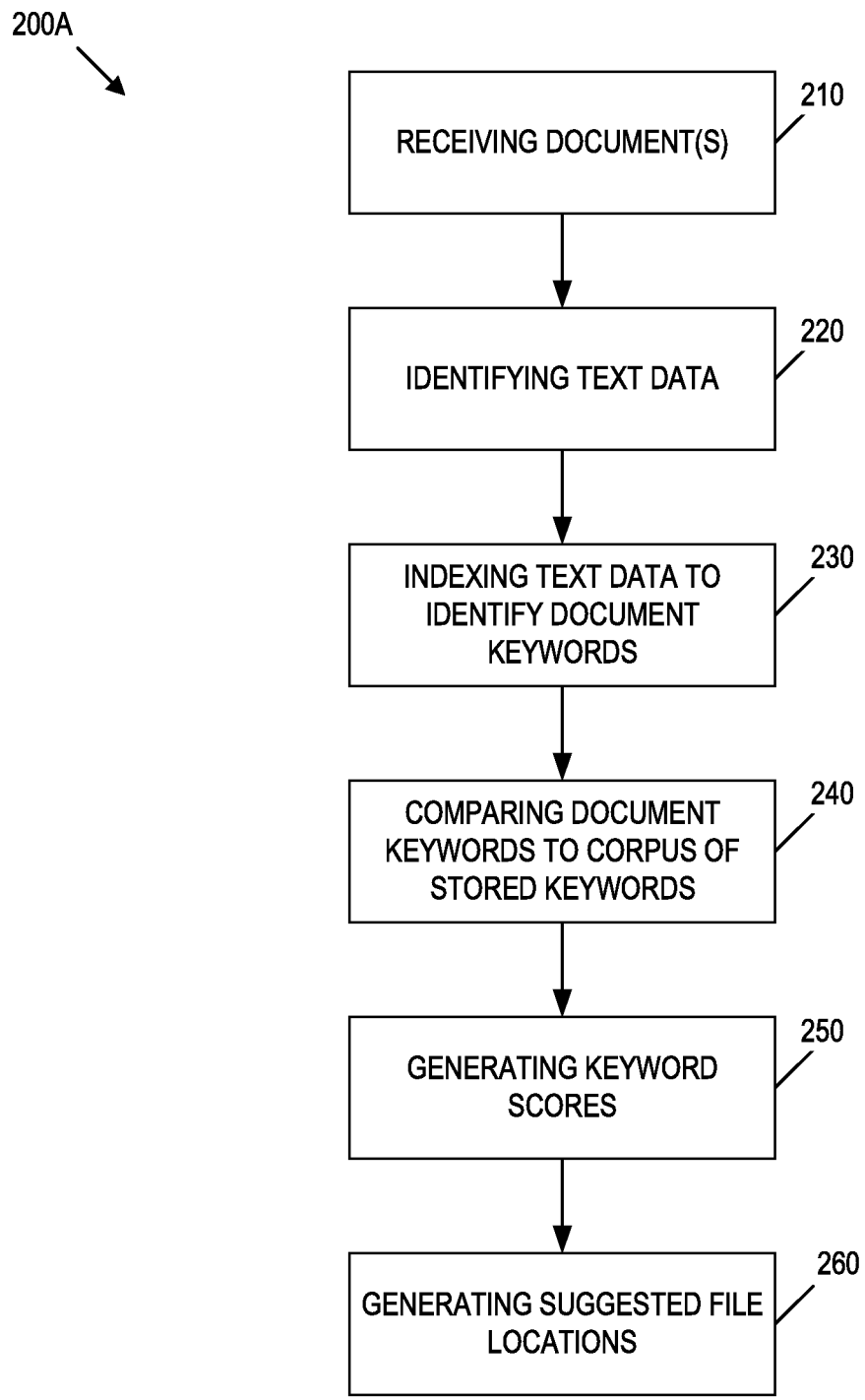
FIG. 2A illustrates a method for generating suggested file locations for filing electronic documents in a database in accordance with the embodiment of FIG. 1A.

Referring now to FIG. 2A, shown therein is an example of a process 200A for generating suggested filing locations for documents in accordance with an example embodiment. Process 200A may be implemented using various computing systems, such as the automatic filing system 100 shown in FIG. 1A. Process 200A may be implemented to assist in a method for automatic ingestion and filing of documents in a database having a plurality of file locations.

At 210, a file can be received by the document analysis application 132. The received files will generally include at least one document. For example, a file may be dragged-and-dropped into an interface of the document management application 114. The file may also be uploaded to the document analysis application 132 from various user devices 102, e.g. an attachment from an email application, a scanned file, or transferred from a digital camera or mobile device.

In some cases, the received file may include multiple documents. In such cases, a document splitting or separating method such as method 300 shown in FIG. 3 and described below may be used to automatically separate the distinct documents in the received file.

At 220, the document analysis application 132 may identify text data in the received file. The document analysis application 132 may identify the text data in each document in the received file(s).

In some cases, the text data may be automatically identifiable if the received file already includes electronic text—e.g. if the text data was created in a word processing or email application, or if text created by optical character recognition has been previously added to the received file. In other cases, for instance where the received file is a scanned file or digital camera image, the document analysis application 132 may perform further processing on the received file to identify the text data. The document analysis application 132 can perform an optical character recognition process on the document to identify the text data. For example, optical character recognition programs such as the open source tesseract-ocr may be used to identify the text data in a document.

In some cases, the document analysis application 132 may preprocess the received file before identifying the text data. For example, the document analysis application 132 may extract metadata from the received file. The extracted metadata may include metadata text data that may indicate potential keywords.

The document analysis application 132 may also preprocess the received file to identify image-based page markers for the pages in the received file. Image-based page markers are generally determined based on the visual characteristics of the page, such as image characteristics determined from analysis of the pages. Image-based page markers may include the location of page numbers or staple marks for example. Page markers identified by document analysis application 132 may be used to identify distinct documents and group related pages, as is discussed in more detail below with reference to FIG. 3. In some cases, portions of the text data may also be identified as page markers.

At 230, the document analysis application 132 may index the text data to identify one or more document keywords. For example, indexing programs such as Apache Solr™ may be used to index the text data.

The document analysis application 132 may also index other page markers, such as the image-based page markers, determined from the received file. For instance, the location of page numbers or staple marks may be indexed to allow the document analysis application 132 to compare such page markers between different pages. In some cases, potential keywords may also be identified in the extracted metadata. The document analysis application 132 may index the potential metadata keywords along with the text data to identify the one or more document keywords.

At 240, the document keywords identified at 230 can be compared to a corpus of stored keywords. The corpus of stored keywords includes keywords already stored on the document filing server 120 that are used to determine potential filing locations for each received document. Each of the stored keywords has at least one file location association identifying a file location associated with that keyword. In some cases, a stored keyword may be associated with multiple file locations.

The corpus of stored keywords can be generated by the document analysis application 132 based on documents previously stored in the database. For instance, the corpus of stored keywords may be generated based on indexed text data from previously stored documents. Document keywords identified in previously stored documents may be included as stored keywords associated with the file location to which those previous documents were file. Similarly, file names of previously stored documents may be used as stored keywords.

The document analysis application 132 can monitor the storage of documents to the document database 130 to update the corpus of stored keywords. This allows the document analysis application 132 to learn from and update the stored keywords to reflect how the user is choosing to store documents.

The corpus of stored keywords can also be generated by the document analysis application 132 based on keywords determined from the file directory characteristics. The corpus of stored keywords may be generated based on file location names or folder names in the file directory, or from the contents of files in a directory. In some cases, users may also manually input keywords to the corpus of stored keywords. For example, a user may tag a file location or folder with one or more user-defined keywords that the user considers particularly relevant to that folder location. An example of a user interface that may be used to input user-defined keywords is shown in FIG. 7 and described below.

At 250, a plurality of keyword scores can be generated based on the comparison of the document keywords and the corpus of stored keywords at 240. The keyword scores reflect a relevance of the stored keywords to the received file, based on the document keywords identified in the document. For example, the keyword score may be determined based on a similarity measure between the document keyword and the stored keyword.

In some cases, the keyword scores can be generated based on a measure of importance of a document keyword to the received document. A keyword coefficient may be determined for each of the document keywords in the text data identified in the document. The keyword coefficient may indicate the measure of importance of that keyword to the document. The keyword coefficients can be used to generate the keyword score for the particular keyword. For example, the keyword score for a document keyword may be determined by modifying the similarity measure using the keyword coefficient (e.g. by addition or multiplication).

The keyword coefficient may be determined using the number of occurrences (occurrence level) of a keyword in the document. The more a word appears in the document may suggest that the word is more important/relevant to the content of the document.

In some cases, the document keyword coefficient may be determined based on keyword text attributes for the document keyword. Keyword text attributes may include the text size and/or text location and/or text formatting of the keyword. For example, keywords with a larger text size may be given a higher keyword coefficient than keywords with a lower text size.

The text location of a document keyword may also be used to determine the keyword coefficient. For example, document keywords identified at the top of the page, or centered in the page, may have a greater keyword coefficient than keywords in other parts of the document. The keyword coefficient may also be determined taking into account a keyword frequency of the keyword in the document.

The measure of importance of a document keyword to the received document, and in turn the keyword coefficient, may also be determined by identifying regions within a document that indicate the keywords are of greater importance. For example, keywords in a title region or header region may be determined to have greater keyword coefficients. In some cases, a header region or footer region may be determined based on expected page attributes such as the expected margins based on the page size.

The document analysis application 132 may also identify a document type of the received document. The document analysis application 132 may determine that the received document is a particular document type out of a plurality of known document types. The document analysis application 132 may identify a plurality of document regions based on the identified document type. Examples of document regions may include a title region, header region, identification region, date region, and the like. Each of the document regions may be associated with a regional importance measure for the document type. For example, the title region may have a higher regional importance measure than the date region. The keyword coefficient for each of the document keywords may be determined based on the regional importance measure of the document region for that document keyword in the document.

Pre-existing document types, such as known legal documents and forms from different industries may be input to the document analysis application 132 to provide the plurality of document types. The document analysis application 132 may use these pre-existing document types to identify a document type of the received file, based on a statistical similarity, layout similarity or other.

At 260, a plurality of suggested file locations can be determined using the keyword scores and the file location associations for the corresponding stored keywords. One or more suggested file locations may then be displayed to the user in a user interface such as user interface 500 shown in FIG. 5, discussed below.

In some cases, the keyword scores determined at 250 may be weighted based on an importance of the stored keyword to a particular file location. Each stored keyword may have a location-specific weighting for each of the at least one file location associations for that stored keyword. The plurality of suggested file locations may then be determined by weighting the plurality of keyword scores using the location-specific weightings for each of the associated file location.

The document database 130 may have a file directory that includes a plurality of folder levels. Each of the file locations in the plurality of file locations can be associated with a particular folder level. In some cases, the location-specific weighting for a particular file location association can be determined using the folder level of the file location corresponding to that file location association. For example, the location-specific weighting for a keyword score may be weighted more highly for file location associations at lower, i.e. more specific, folder levels, than for file locations at higher, more general file locations.

Figures 5, 6:
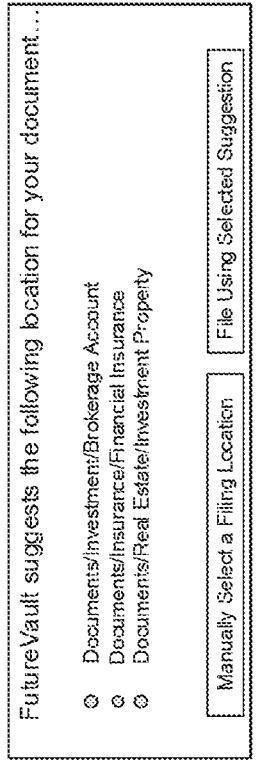
FIG. 5 illustrates a screenshot of a suggested file location user interface in accordance with some embodiments.
FIG. 6 illustrates a screenshot of a keyword weighting user interface in accordance with some embodiments.

In some cases, the location-specific weightings may include user-defined weightings set by a user of user device 102. For example, where a user inputs user-defined keywords to be associated with a file location, the user may then set a weighting to indicate relative importance of the keywords to the particular file location. An example user interface 600 is shown in FIG. 6 that may allow a user to define weightings for stored keywords.

Displaying a plurality of suggested filing locations may facilitate a user's bookkeeping and save the user time. It may also provide educational value by indicating to the user file locations containing similar documents. This may identify to the user that various folders may include documents that are similar or related, that a user may not otherwise expect.

Because the document analysis application 132 generates suggested filing locations, users may add documents to the server 120 without being required to immediately determine a filing location. Users may be prompted when the documents are uploaded with suggested filing locations as shown in FIG. 5. Users may defer selection of the files, and the document analysis applications 132 may store documents temporarily in an unfiled documents folder. In some cases, the document analysis application 132 may tentatively file the documents in the top suggested file location. In some cases, the users may be periodically prompted with suggested filing locations for their unfiled or tentatively filed documents, spreading the task out to when users have idle time to improve engagement for document filing.

In some embodiments, the document analysis application 132 may also determine a recommended file name for the document based on the document keywords identified in the document. The document analysis application 132 may determine keyword coefficients for each of the document keywords in the text data when determining a recommended file name. The keyword coefficients may indicate the importance of the corresponding keyword to the document. The recommended file name may then be identified using the keyword coefficients of the document keywords. The document analysis application 132 may determine the recommended file name using the document keywords determined to be most important or relevant to the document.

As mentioned above, the keyword coefficients may be determined using keyword text attributes, such as text size, text format and text location. For example, document keywords identified in a title document region, or document keywords with larger text size, may be used to generate a recommended file name. Keyword coefficients may also be determined using the number of occurrences of a keyword in the document.

In some cases, the document analysis application 132 may compare the one or more document keywords to stored file names associated with the plurality of suggested file locations. The recommended file name may be determined based on the file names of documents previously stored to the same or similar folders. For example, a correspondence or naming convention may be identified between document keywords of previously stored files and the file names of those previously stored file. The file name for the new file may then be recommended using the identified naming convention for the document keywords of the new document.

Generating recommended file names for the files to be stored may allow for quicker filing for documents that are incorrectly named, or have generic/non-descriptive names. This may be particularly useful when multiple documents are uploaded with generic names, such as scanned documents or images from digital cameras. Furthermore, generated recommended file names may be helpful when multi-document files are split into multiple distinct files, for example using methods 300 or 400 shown in FIGS. 3 and 4 respectively and described below.

In some cases, the document analysis application 132 may adjust the locations-specific weights for various keywords by ongoing monitoring of stored documents. The document analysis application 132 may monitor the document keywords and file locations of document as they are stored to update the location-specific weighting for various keywords. Similarly, the document analysis application 132 may monitor the file names given to stored documents to modify the correspondence between document keywords and recommended file names.

Figure 2B:
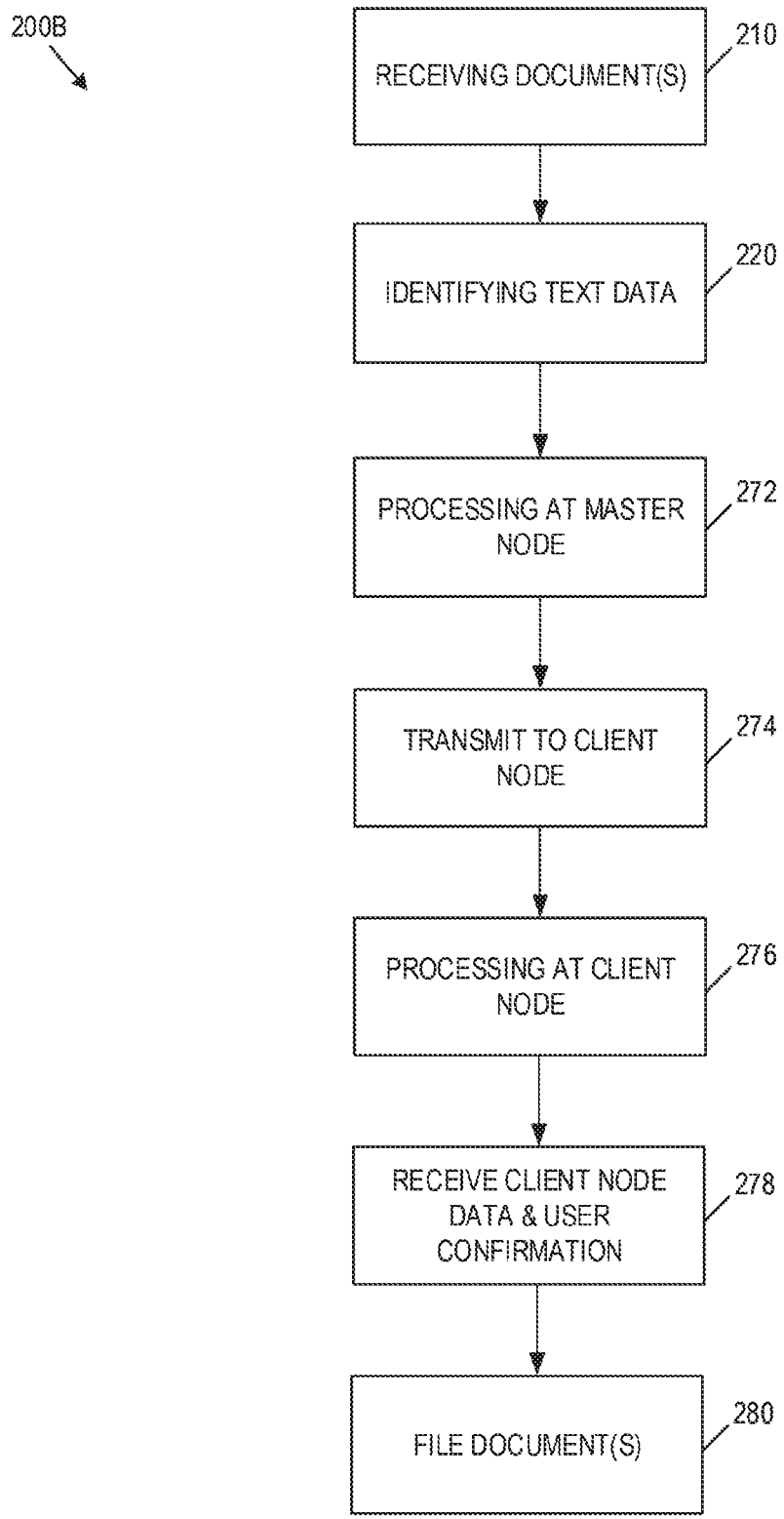
FIG. 2B illustrates a method for generating suggested file locations for filing electronic documents in a database in accordance with the embodiment of FIG. 1B.

Referring now to FIG. 2B, shown therein is an example of a process 200B for generating suggested filing locations for documents in accordance with an example embodiment. Process 200B may be implemented using various computing systems, such as the automatic filing system 100' shown in FIG. 1B. Process 200B may be implemented to assist in a method for automatic ingestion and filing of documents in a database having a plurality of file locations.

At 210, a file can be received by the document analysis application 132'. The received files will generally include at least one document. For example, a file may be dragged-and-dropped into an interface of the document management application 114'. The file may also be uploaded to the document analysis application 132' from various user devices 102', e.g. an attachment from an email application, a scanned file, or transferred from a digital camera or mobile device.

In some cases, the received file may include multiple documents. In such cases, a document splitting or separating method such as method 300 shown in FIG. 3 and described below may be used to automatically separate the distinct documents in the received file.

At 220, the document analysis application 132' may identify text data in the received file. The document analysis application 132' may identify the text data in each document in the received file(s).

In some cases, the text data may be automatically identifiable if the received file already includes electronic text—e.g. if the text data was created in a word processing or email application, or if text created by optical character recognition has been previously added to the received file. In other cases, for instance where the received file is a scanned file or digital camera image, the document analysis application 132' may perform further processing on the received file to identify the text data. The document analysis application 132' can perform an optical character recognition process on the document to identify the text data. For example, optical character recognition programs such as the open source tesseract-ocr may be used to identify the text data in a document.

In some cases, the document analysis application 132' may preprocess the received file before identifying the text data. For example, the document analysis application 132' may extract metadata from the received file. The extracted metadata may include metadata text data that may indicate potential keywords.

The document analysis application 132' may also preprocess the received file to identify image-based page markers for the pages in the received file. Image-based page markers are generally determined based on the visual characteristics of the page, such as image characteristics determined from analysis of the pages. Image-based page markers may include the location of page numbers or staple marks for example. Page markers identified by document analysis application 132' may be used to identify distinct documents and group related pages, as is discussed in more detail below with reference to FIG. 3. In some cases, portions of the text data may also be identified as page markers.

At 272, the document analysis application 132' may communicate with a master node, such as master node 150 of system 100', to process the text data. The master node will be pre-trained using relevant data to have one or more feature vectors that may be used to process the text data and to generate first or master prediction data for the text data. In addition, the master node may be continuously trained using a feedback process from a plurality of different client nodes (which may correspond to different users), as described herein, for example with reference to FIG. 8. In this way, system 100' can generate prediction data (and the plurality of suggested file locations) based on the content of a user's documents as uploaded by the user, and also based on the aggregate of all user documents that have been uploaded to the system and processed by the master node. Thus, system 100' can automatically generate associations between documents to suggest locations by creating relations between similar words in other documents. The locations of documents that match highly can be used to return weighted filing location predictions.

Master prediction data may be, for example, predicted one or more file names, predicted file locations, predicted attributes or metadata, etc. For example, if a source document is a monthly bank statement, the master prediction data may have a bank name, a bank account number, a date of the statement, a predicted file name, a predicted file location (e.g., at a first and second level in a hierarchy), and so on. If multiple predictions are made in a particular category (e.g., multiple file locations are predicted), the predictions may be ranked according to the confidence level of the prediction.

In some cases, if the master node is unable to generate a prediction, or unable to generate a sufficient number of predictions beyond a threshold, the system may revert to a keyword-based approach as described with reference to FIG. 2A.

At 274, the master prediction data and the text data may be transmitted to a client node, such as client node 154 of system 100', for further processing.

At 276, the client node may process the text data and the master prediction data to refine the predictions and thereby generate refined prediction data. In addition to the master prediction data, the refined prediction data may have additional file location predictions (e.g., third level and higher level file location predictions) and more detailed file name predictions that correspond to a particular user's tastes.

Because the system generates suggested or predicted filing locations, in some cases documents may be filed immediately at 280 upon receiving the refined prediction data, by selecting the highest ranked predictions.

In some other cases, the refined prediction data may be communicated to document management application 114' for presentation to the user, and user input may be received at 278 either confirming the highest ranked predictions, or else indicating which of the predictions were selected (or if the user overrode the predictions). The documents may then be filed at 280.

Figure 3:
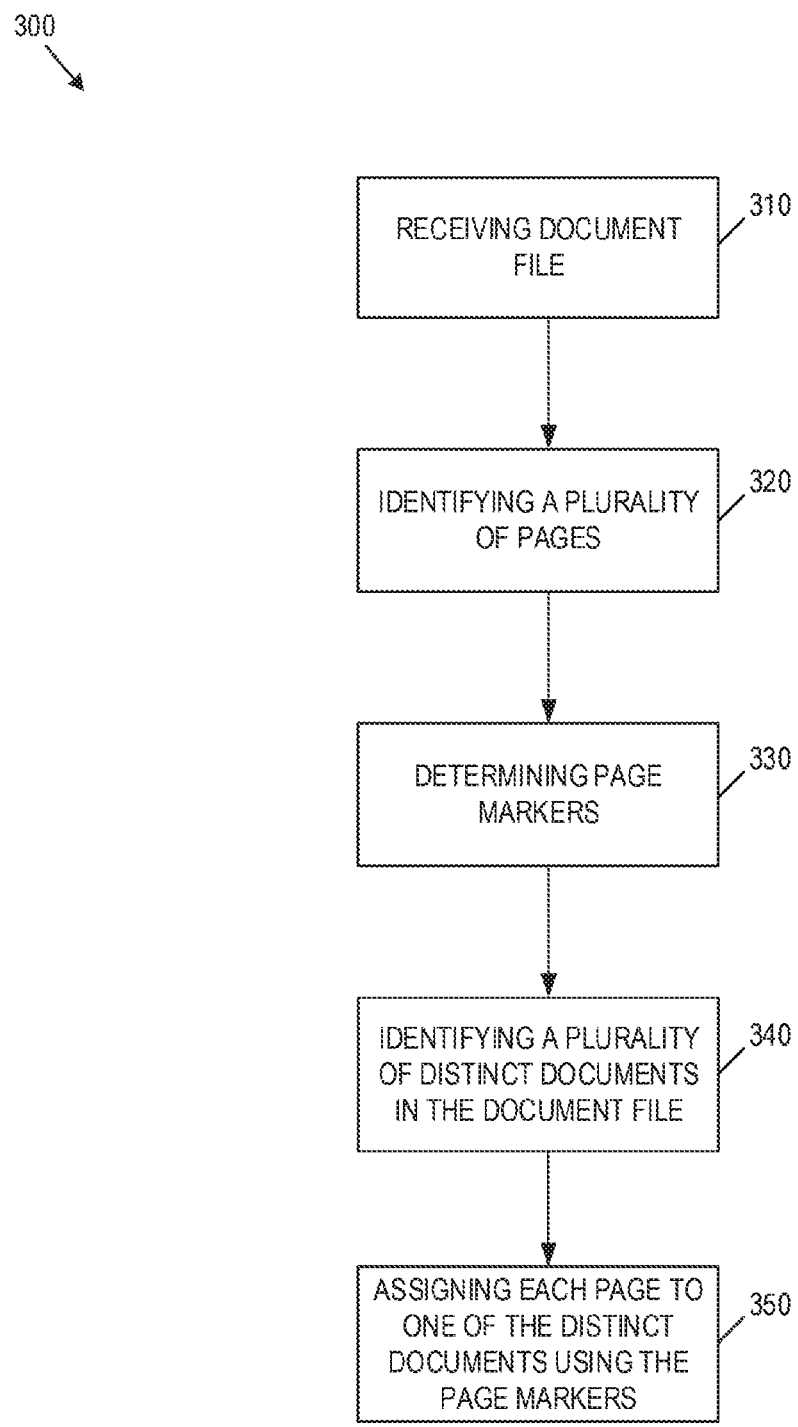
FIG. 3 illustrates a method for ingesting electronic documents in accordance with some embodiments.

Referring now to FIG. 3, shown therein is an example of a process 300 for automatically splitting received documents into a plurality of distinct documents in accordance with an example embodiment. Process 300 may be implemented in some embodiments of the process 200A or 200B for generating suggested filing locations using a computing system such as system 100 of FIG. 1A or system 100' of FIG. 1B.

At 310, the at least one document may be received as a single file. The document analysis application 132 or 132' may receive the file(s) in the same manner as described above (e.g., at 210 of FIG. 2A or FIG. 2B).

At 320, the document analysis application 132 can identify a plurality of pages in the received file. For example, the plurality of pages may be identified based on metadata or image characteristics extracted from the received file.

At 330, a plurality of page markers can be determined for each page. The page markers may include image-based page markers and/or text-based page markers.

Image-based page markers generally include visual or image-based characteristics that can be identified in the received document. That is, the image-based page markers generally reflect the visual appearance or look of the page. Examples of image-based page markers include page layout, page orientation/angle, angle of text, page number position, artifacts such as staple marks, page background characteristics, color characteristics, average density, grey scales and other image characteristics derived from the page.

Text-based page markers refer to page markers derived from the text-data in the document. For instance, text based page markers may include corresponding titles, corresponding headers/footers, sequential page numbering, punctuation/grammar page markers (e.g. a lack of punctuation at the end of a page, no capital letters at the beginning of the next page)

The page markers may also include metadata page markers. Metadata page markers can be identified in metadata extracted from a received file.

At 340, the document analysis application may determine that the at least one document comprises a plurality of distinct documents. At 350, each page can be assigned to one of the distinct documents by grouping the plurality of pages into the distinct documents by comparing the page markers for the plurality of pages.

In general, steps 340 and 350 may occur concurrently or effectively simultaneously. The page markers determined at 330 may be used to cluster or classify pages into groups, for example using Bayesian classifiers. As a result of this classification process, the document analysis application 132 may determine both that there are a plurality of distinct documents and the assignment of pages to those distinct documents.

Once a plurality of distinct documents are identified, and the pages are assigned to the distinct documents, separate electronic files can be generated for each document. The document analysis application 132 may then determine suggested filing locations for each of the distinct documents, using embodiments of method 200A or 200B described above. Furthermore, as the newly created electronic documents may be initially unnamed (or have generic temporary file names), the document analysis application 132 may use the processes described herein to generate recommended filing names to facilitate the creation and storage of such documents.

Figure 4:
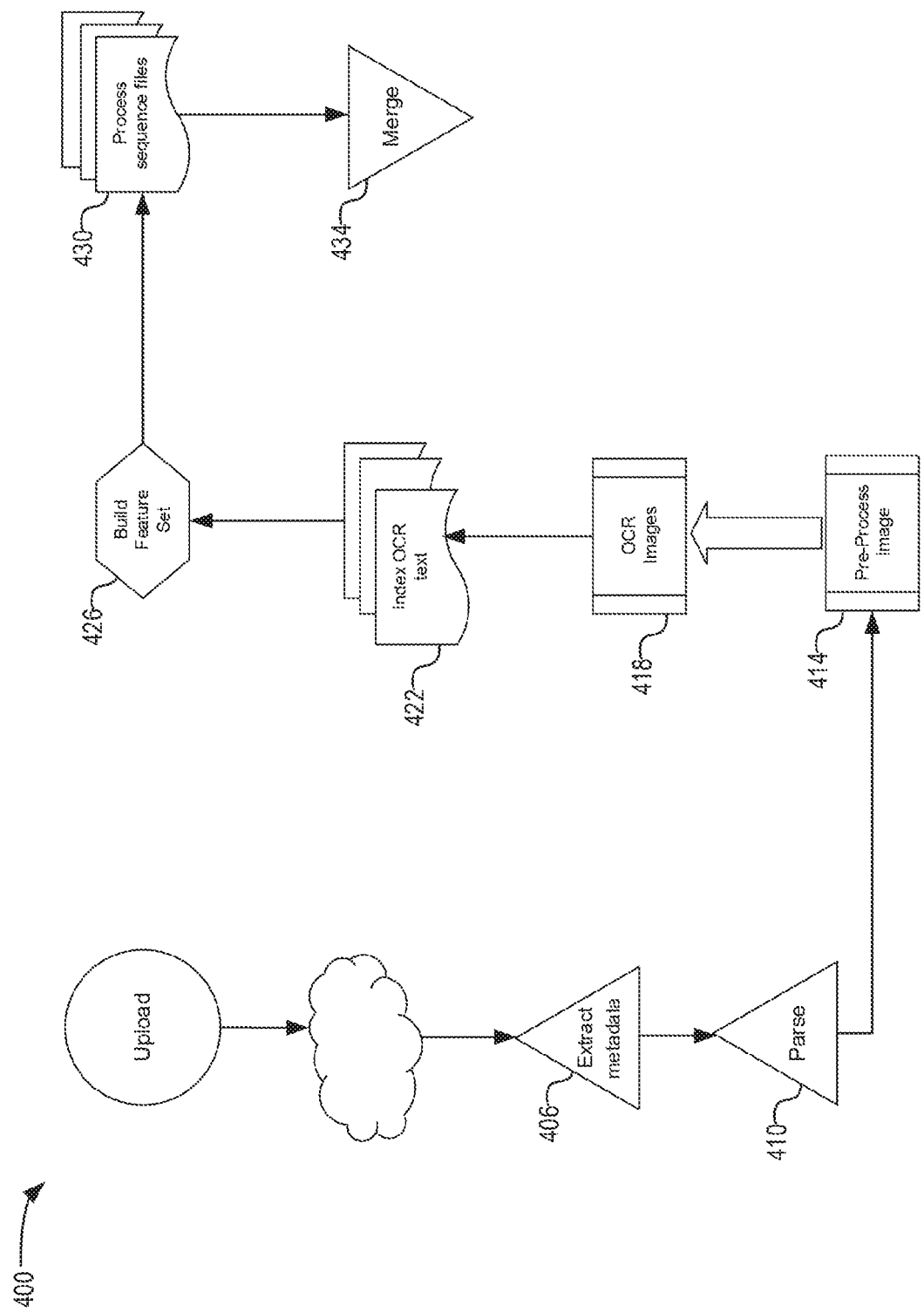
FIG. 4 illustrates a process for ingesting electronic documents in accordance with some embodiments.

Referring now to FIG. 4, shown therein is an embodiment of a flowchart 400 showing an example process for automatic ingestion and splitting of electronic documents that may be used by system 100A or system 100B. The process shown in flowchart 400 provides a specific example of how process 300 described above may be implemented when a PDF document store is uploaded to the document filing server 120.

The process 400 begins at 402 with a user or client sending or uploading an electronic file to the document server 120 or 120'. In the example shown in FIG. 4, the electronic file is a PDF document store.

Once the PDF document store is received, the document analysis application 132 or 132' can extract metadata from the received file at 406. The document analysis application 132 or 132' may also separate the PDF document into individual PDF pages using a burst operation. The individual PDF pages may then be parsed using a computer vision application such as OpenCV to identify image characteristics in each of the pages at 410. The computer vision application may identify artifacts or page characteristics which may subsequently be used to identify pages corresponding to the same document, for example using Hough transforms. One example of such an artifact may be staple marks. Other image characteristics may include page orientation, text angle, color, density and so forth.

The image characteristics may then be used to pre-process the received pages at 414. For example, image processing applications such as ImageMagick® may be used to pre-process the received pages. Once the pages have been pre-processed, text data may be identified in the pages at 418. Where the received pages do not already have identifiable text data, optical character recognition may be performed using applications such as Tesseract-ocr.

Once identified, the text data may be used to build a feature set, or feature vectors at 426.

In some embodiments, the text data may then be indexed to identify document keywords. The text data may be indexed using indexing applications such as Apache Solr. The image characteristics identified in the received pages may similarly be indexed.

The indexed data for each page can be used to generate feature vectors for that page. These feature vectors may then be used to generate a page characteristic index using an application such as Apache Lucene™ and/or Elasticsearch™. The page characteristic indexes for each page can then be classified, e.g. using Bayesian classifiers in Apache Mahout™ to identify pages corresponding to the same distinct documents at 430. The corresponding pages may then be merged into distinct documents files based on the classification.

In some other embodiments, indexing of text data to identify document keywords may be omitted, and the raw text data may be input directly to the nodes of the machine learning system to generate feature vectors for the raw text data and to perform the classification at 430.

Referring now to FIG. 5, shown therein is a screenshot of a user interface 500 that may be displayed to a user. User interface 500 is an example of a file location selection user interface that may display one or more suggested file locations to the user of the user device 102 or 102'. The user may be able to rapidly select a file location from user interface 500 to file a document. The user may also choose to select an alternative file location.

In some cases, a user may choose to defer selecting a file location for files added to the document database 130. Such documents may be stored in an unfiled documents folder, or tentatively stored in the first suggested filing location, until the user selects a file location to store the documents. In such cases, the user may be periodically prompted using a user interface such as user interface 500 to select file locations for unfiled documents. Alternatively, the user may navigate to the unfiled documents folder and select a document for filing. At that time, user interface 500 may be displayed to the user.

Referring now to FIG. 6, shown therein is a screenshot of a user interface 600 that may be displayed to a user. A user of user device 102 may interact with user interface 600 to adjust the location-specific weightings for various folders and folder levels, and in turn for various keywords.

In the example user interface 600 shown in FIG. 6, the user may adjust the folder level weight to be applied to folders at a particular folder level. In the example shown, the folder-level location-specific weight for each folder of folder level 1 (i.e. a higher level, likely more generic folder) is set to 5 on a scale of 1-100. The weight of a lower level folder may then be set to a higher weight, for example 10 or 15. In some cases, these folder weights may be set or adjusted automatically by document analysis application 132. For instance, as additional folder levels are added, the folder weights may be adjusted to account for the different levels of granularity in the folder levels.

The user may also adjust a weighting threshold value that adjusts how much a folder's particular folder level is used to weight the keyword scores generated for particular keywords. In the example user interface 600, a higher threshold value places a greater value on the weight assigned to a particular folder level. In the example shown, if the weighting threshold value is set to 0, the keyword scores for a particular keyword are not adjusted based on the particular folder level for the file locations associated therewith. However, the keyword scores may still be weighted based on location specific weightings for specific keywords, such as user-defined location-specific weightings (indicating the relative importance/relevance of the stored keyword to that file location).

Referring now to FIG. 7, shown therein is a screenshot of a user interface 700 that may be displayed to a user. User interface 700 is an example of a keyword definition user interface that may be used by a user of the user device 102 to define keywords for one or more file locations. As shown in user interface 700, the document database may include a plurality of categories/folders with different folder levels. The folder levels may indicate whether a particular folder/category is a top level folder/category (i.e. level 1) or whether it is a sub-folder/sub-category (e.g. level 2, level 3 and so on). One or more user-defined keywords may be associated with the various categories/folders.

User-defined keywords may facilitate the determination of suggested filing locations when a user is beginning to user the document database (i.e. there are few or none previously stored documents. As additional documents are added to the document database 130, the weight or importance given to the user-defined keywords may be modified as the document analysis application 132 learns from the storage of previous documents. Similarly, a user may adjust the weight to be given to a particular keyword using an interface such as user interface 600.

Figure 8:
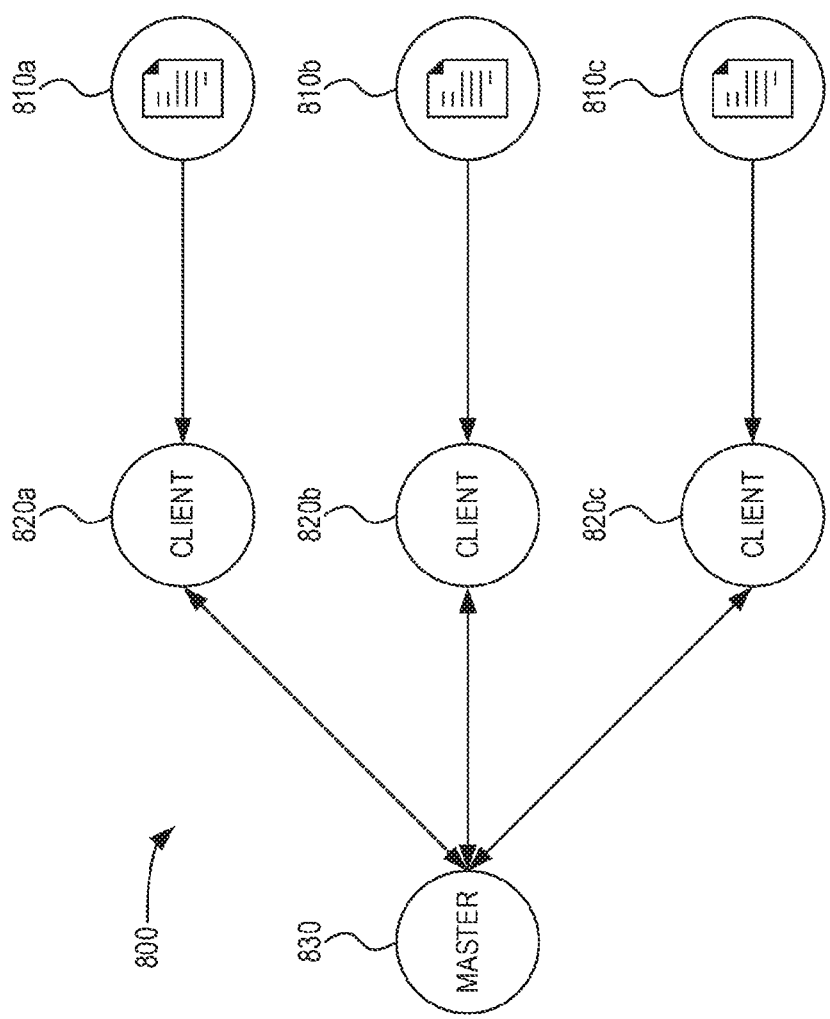
FIG. 8 illustrates a flow diagram used for machine learning in accordance with the embodiment of FIG. 1B.

Referring now to FIG. 8, shown therein is an example feedback flow in accordance with some embodiments for feedback-reinforced learning for the machine learning nodes of system 1006. The process shown in flowchart 800 provides a specific example of how the nodes may be provided with feedback to reinforce certain learning and to update feature vectors to provide improved predictions.

Flow 800 begins with the input of documents 810a to 810c at respective user devices 102'. For example, document 810a may be input via a document management application 114' stored on a first user device. Document 810b may be input via a document management application 114' stored on a second user device, and document 810c may be input via a document management application 114' stored on a third user device.

Each of the first, second and third devices may be instances of user device 102' of system 100B, therefore each of the first, second and third devices may have respective client nodes 820a, 820b and 820c, which are instances of client node 154 of system 100B.

Each document management application will process the document 810 as described herein, and may generate learning data such as the user identification of the user of document management application, the text data of the document 810, and the file name and file location chosen by the user when filing the document 810. This client node learning data can then be provided to the respective client node, which can then update its local feature vectors using the output. In some embodiments, the client node learning data may be provided as a JSON object. For example, client node learning data from document 810a may be input to the client node 820a of the first user device, client node learning data from document 810b may be input to the client node 820b of the second user device, and client node learning data from document 810c may be input to the client node 820c of the third user device.

In this way, each client node can act as a localized artificial intelligence that learns user-specific file naming and filing conventions. That is, client node learning data from document 820b which is filed by a user of the second user device will not affect client node 820a, and vice versa.

However, more generalized learning data can still be used to improve the performance of the master node, such as a master node 150 of system 100B. In particular, the master node can be provided with a subset of the learning data from each client node 820a, 820b and 820c, which can then be used for learning by the master node.

In some embodiments, each client node 820*a* to 820*c* can output a learning data subset—or master node learning data—to the master node. In some embodiments, the master node learning data may be a JSON object, and may be pseudo-anonymized by removing the user identification. The master node learning data can also be generalized by removing file location data higher than the second level. That is, file location data can be limited only to the first or second level, such as "/Banking/Bank Accounts". Higher level file locations, such as the "MySavings" in "Banking/Bank Accounts/MySavings", can be stripped. The text data of the source document may still be provided, however, since it serves as the basis for the learning.

In some embodiments, master node 830 may also provide learning data to client nodes 820*a* to 820*c*. This may occur, for example, when providing suggested file locations, which can then be used by each client node to further refine its respective predictions.

In some embodiments, a document management application may directly provide master node learning data to the master node, rather than via the client node.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

We claim:

1. A method for automatic ingestion and filing of documents in a database, the database having a plurality of folder levels within a hierarchy and a plurality of file locations of previously stored documents, wherein each file location of the plurality of file locations is associated with any one of the plurality of folder levels, the method comprising:
providing a plurality of stored keywords, based on the previously stored documents, wherein each of the plurality of stored keywords is associated with at least one of the plurality of file locations, wherein a selected keyword in the plurality of stored keywords is associated with at least two of the plurality of file locations, wherein a first location of the at least two of the plurality of file locations has a first location-specific weighting indicating a relevance of the first location to the selected keyword, and wherein a second location of the at least two of the plurality of file locations has a second location-specific weighting indicating a relevance of the second location to the selected keyword;
receiving an electronic file comprising a document;
identifying text data in the document;
indexing the text data to identify one or more document keywords;
comparing the one or more document keywords to the plurality of stored keywords;
based on the comparing, generating a ranked plurality of suggested file locations for the document, wherein the generating the ranked plurality comprises, for each element of the one or more document keywords:
generating a respective keyword score for the element, wherein the respective keyword score is based on a similarity measure between any selected one of the plurality of stored keywords and the element;
adding the at least one file location associated with the selected one to the ranked plurality in association with the element; and
ranking the at least one file location associated with the element in the ranked plurality according to the respective keyword score of the element and, when the selected one is the selected keyword, modifying the ranking of the first location based on the first location-specific weighting, and modifying the ranking of the second location based on the second location-specific weighting.

2. The method of claim 1, further comprising:
identifying a plurality of pages in the document;
determining a plurality of page markers for each page;
determining that the document comprises a plurality of distinct documents; and
assigning each page to one of the distinct documents by grouping the plurality of pages into the distinct documents by comparing the page markers for the plurality of pages.

3. The method of claim 2, wherein the page markers comprise image-based page markers derived from a visual appearance of the page.

4. The method of claim 2, wherein the page markers comprise text-based page markers derived from the text data in the document.

5. The method of claim 1, further comprising determining a keyword coefficient for each element of the one or more document keywords the keyword coefficient indicating a measure of importance of the element to the document, wherein the respective keyword score is further based on the keyword coefficient.

6. The method of claim 5, wherein the measure of importance of the element to the document is determined by identifying keyword text attributes for the element, the keyword text attributes including at least one of a text size, a text location and a text format, wherein the determining the keyword coefficient for the element is based on the keyword text attributes.

7. The method of claim 5, further comprising determining a recommended file name for the document based on the keyword coefficient of the one or more document keywords.

8. The method of claim 1, wherein identifying the text data comprises performing optical character recognition on the document to identify the text data.

9. The method of claim 1, wherein indexing the text data to identify the one or more document keywords comprises determining whether an occurrence level for one or more words in the document is greater than a keyword threshold.

10. The method of claim 1, wherein the plurality of stored keywords are generated based on at least one of: file names of previously stored documents, document keywords identified in previously stored documents, file location names in the file directory, folder location names in the file directory, contents of files in the file directory and user-defined keywords associated with specific files and folders in the file directory.

11. A computer program product for automatic ingestion and filing of documents in a database, the database having a plurality of folder levels within a hierarchy and a plurality of file locations of previously stored documents, wherein each file location of the plurality of file locations is associated with any one of the plurality of folder levels, the computer program product comprising a non-transitory computer readable storage medium and computer-executable instructions stored on the computer readable storage medium, the instructions for configuring a processor to:

provide a plurality of stored keywords, based on the previously stored documents, wherein each of the plurality of stored keywords is associated with at least one of the plurality of file locations, wherein a selected keyword in the plurality of stored keywords is associated with at least two of the plurality of file locations, wherein a first location of the at least two of the plurality of file locations has a first location-specific weighting indicating a relevance of the first location to the selected keyword, and wherein a second location of the at least two of the plurality of file locations has a second location-specific weighting indicating a relevance of the second location to the selected keyword;

receive an electronic file comprising a document;

identify text data in the document;

index the text data to identify one or more document keywords;

compare the one or more document keywords to the plurality of stored keywords;

based on the comparing, generate a ranked plurality of suggested file locations for the document, wherein the generating the ranked plurality comprises, for each element of the one or more document keywords:

generating a respective keyword score for the element, wherein the respective keyword score is based on a similarity measure between any selected one of the plurality of stored keywords and the element;

adding the at least one file location associated with the selected one to the ranked plurality in association with the element; and ranking the at least one file location associated with the element in the ranked plurality according to the respective keyword score of the element and, when the selected one is the selected keyword, modifying the ranking of the first location based on the first location-specific weighting, and modifying the ranking of the second location based on the second location-specific weighting.

12. The computer program product of claim 11, further comprising instructions for configuring the processor to:

identify a plurality of pages in the document;

determine a plurality of page markers for each page;

determine that the document comprises a plurality of distinct documents; and assign each page to one of the distinct documents by grouping the plurality of pages into the distinct documents by comparing the page markers for the plurality of pages.

13. The computer program product of claim 12, wherein the page markers comprise image-based page markers derived from a visual appearance of the page.

14. The computer program product of claim 13, wherein the page markers comprise text-based page markers derived from the text data in the document.

15. The computer program product of claim 11, further comprising instructions for configuring the processor to determine a keyword coefficient for each element of the one or more document keywords the keyword coefficient indicating a measure of importance of the element to the document, wherein the respective keyword score is further based on the keyword coefficient.

16. The computer program product of claim 15, further comprising instructions for configuring the processor to determine the measure of importance of the element to the document by identifying keyword text attributes for the element, the keyword text attributes including at least one of a text size, a text location and a text format, wherein determining the keyword coefficient for the element is based on the keyword text attributes.

17. The computer program product of claim 15, further comprising instructions for configuring the processor to determine a recommended file name for the document based on the keyword coefficient of the one or more document keywords.

18. The computer program product of claim 11, further comprising instructions for configuring the processor to identify the text data by performing optical character recognition on the document.

19. The computer program product of claim 11, wherein indexing the text data to identify the one or more document keywords comprises determining whether an occurrence level for one or more words in the document is greater than a keyword threshold.

20. The computer program product of claim 11, wherein the plurality of stored keywords are generated based on at least one of: file names of previously stored documents, document keywords identified in previously stored documents, file location names in the file directory, folder location names in the file directory, contents of files in the file directory and user-defined keywords associated with specific files and folders in the file directory.

* * * * *